(12) United States Patent
Cao et al.

(10) Patent No.: US 7,094,389 B2
(45) Date of Patent: Aug. 22, 2006

(54) CHABAZITE-CONTAINING MOLECULAR SIEVE, ITS SYNTHESIS AND ITS USE IN THE CONVERSION OF OXYGENATES TO OLEFINS

(75) Inventors: Guang Cao, Branchburg, NJ (US); Machteld M. Mertens, Boortmeerbeek (BE); Karl G. Strohmaier, Port Murray, NJ (US); Richard B. Hall, Whitehouse Station, NJ (US); Thomas Herman Colle, Houston, TX (US); Mobae Afeworki, Stewartsville, NJ (US); Antonie J. Bons, Kessel-Lo (BE); Wilfried J. Mortier, Kessel-Lo (BE); Chris Kliewer, Clinton, NJ (US); Hailian Li, Sunnyvale, CA (US); Anil S. Guram, San Jose, CA (US); Robert J. Saxton, Pleasanton, CA (US); Mark T. Muraoka, Mountain View, CA (US); Jeffrey C. Yoder, San Jose, CA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/017,286

(22) Filed: Dec. 20, 2004

(65) Prior Publication Data

US 2005/0154244 A1    Jul. 14, 2005

Related U.S. Application Data

(60) Provisional application No. 60/532,600, filed on Dec. 23, 2003.

(51) Int. Cl.
*C01B 39/48* (2006.01)
(52) U.S. Cl. ............... 423/706; 423/707; 423/708; 423/709; 585/639; 585/640

(58) Field of Classification Search ............... 423/705, 423/706, 707, 708, 709, 306, 328.2, 329.1, 423/DIG. 30; 502/214; 585/639, 640
See application file for complete search history.

(56) References Cited

U.S. PATENT DOCUMENTS

| 4,544,538 A | 10/1985 | Zones ............... 423/326 |
| 5,958,370 A | 9/1999 | Zones et al. .......... 423/706 |

(Continued)

FOREIGN PATENT DOCUMENTS

EP    0 613 859 A    9/1994

(Continued)

OTHER PUBLICATIONS

Barrer et al, "The Hydothermal Chemistry of the Silicates. Part VII.* Synthetic Potassium Aluminosilicates", J. Chem. Soc., pp. 2822-2891 (1956).

(Continued)

*Primary Examiner*—David Sample

(57) ABSTRACT

A crystalline material substantially free of framework phosphorus and comprising a CHA framework type molecular sieve with stacking faults or at least one intergrown phase of a CHA framework type molecular sieve and an AEI framework type molecular sieve, wherein said material, in its calcined, anhydrous form, has a composition involving the molar relationship:

$$(n)X_2O_3{:}YO_2,$$

wherein X is a trivalent element; Y is a tetravalent element; and n is from 0 to about 0.5. The material exhibits activity and selectivity in the conversion of methanol to lower olefins, especially ethylene and propylene.

51 Claims, 9 Drawing Sheets

U.S. PATENT DOCUMENTS

| | | |
|---|---|---|
| 6,334,994 B1 | 1/2002 | Wendelbo et al. .......... 423/718 |
| 2002/0165089 A1 | 11/2002 | Janssen et al. .............. 502/214 |
| 2003/0069449 A1* | 4/2003 | Zones et al. ................ 564/463 |
| 2003/0176751 A1 | 9/2003 | Strohmaier et al. ......... 585/639 |
| 2003/0232006 A1* | 12/2003 | Cao et al. ................... 423/705 |
| 2003/0232718 A1* | 12/2003 | Cao et al. ................... 502/214 |

FOREIGN PATENT DOCUMENTS

| | | |
|---|---|---|
| GB | 868846 | 5/1961 |
| WO | WO 95/05342 | 2/1995 |
| WO | WO 98/15496 | 4/1998 |
| WO | WO 03/078324 | 9/2003 |

OTHER PUBLICATIONS

Yuen, L.-T. et al, "A Product Selectivity in Methanol to Hydocarbon Conversion for Isostructural Compositions of AFI and CHA Molecular Sieves", Microporous Materials 2, pp. 105-117 (1994).

Dahl, I.M. et al, "Structural and Chemical Influences on the MTO Reaction: A Comparison of Chabazite and SAPO-34 as MTO Catalysts", Microporous and Mesoporous Materials 29, pp. 185-190 (1999).

Diaz-Cabanas, et al, "Synthesis and Structure of Pure $SiO_2$ Chabazite: the $SiO_2$ Polymorph with the Lowest Framework Density", Chem. Commun. 1881-1882 (1998).

Skeels G.W. et al, "Synthesis and Characterization of Phi-Type Zeolites LZ-276 and LZ-277: Faulted Members of the ABC-D6R Family of Zeolites", Microporous Mesoporous Mater; Microporous and Mesoporous Materials 1999 Elsevier Sci B.V., Amsterdam, Netherlands, vol. 30, No. 2, 1999, pp. 335-346.

Bateman, Charles A. et al, "Structure of Zeolite LZ-277", Proc. Annu. Meet Microsc Soc Am; Proceedings—Annual Meeting, Microscopy Society of America 1994, 1994, pp. 784-785.

Wagner, Paul et al, Guest/Host Relationships in the Synthesis of the Novel Cage—Based Zeolites SSZ-35, SSZ-36, and SSZ-39, Journal of the American Chemical Society 2000, 122(2), pp. 263-273.

\* cited by examiner

US 7,094,389 B2

CHABAZITE-CONTAINING MOLECULAR SIEVE, ITS SYNTHESIS AND ITS USE IN THE CONVERSION OF OXYGENATES TO OLEFINS

CROSS REFERENCE TO RELATED APPLICATIONS

This application claims priority to Provisional Application No. 60/532,600, filed Dec. 23, 2003, the disclosures of which are incorporated by reference.

FIELD OF INVENTION

This invention relates to a novel chabazite-containing molecular sieve, its synthesis and its use in the conversion of oxygenates, particularly methanol, to olefins, particularly ethylene and propylene.

BACKGROUND OF INVENTION

The conversion of oxygenates to olefins (OTO) is currently the subject of intense research because it has the potential for replacing the long-standing steam cracking technology that is today the industry-standard for producing world scale quantities of ethylene and propylene. The very large volumes involved suggest that substantial economic incentives exist for alternate technologies that can deliver high throughputs of light olefins in a cost efficient manner. Whereas steam cracking relies on non-selective thermal reactions of naphtha range hydrocarbons at very high temperatures, OTO exploits catalytic and micro-architectural properties of acidic molecular sieves under milder temperature conditions to produce high yields of ethylene and propylene from methanol.

Current understanding of the OTO reactions suggests a complex sequence in which three major steps can be identified: (1) an induction period leading to the formation of an active carbon pool (alkyl-aromatics), (2) alkylation-dealkylation reactions of these active intermediates leading to products, and (3) a gradual build-up of condensed ring aromatics. OTO is therefore an inherently transient chemical transformation in which the catalyst is in a continuous state of change. The ability of the catalyst to maintain high olefin yields for prolonged periods of time relies on a delicate balance between the relative rates at which the above processes take place. The formation of coke-like molecules is of singular importance because their accumulation interferes with the desired reaction sequence in a number of ways. In particular, coke renders the carbon pool inactive, lowers the rates of diffusion of reactants and products, increases the potential for undesired secondary reactions and limits catalyst life.

Over the last two decades, many catalytic materials have been identified as being useful for carrying out the OTO reactions. Crystalline microporous materials are the preferred catalysts today because they simultaneously address the acidity and morphological requirements for the reactions. Particularly preferred materials are eight-membered ring aluminosilicates, such as those having the chabazite and AEI framework types, and their silicoaluminophosphate counterparts, such as SAPO-34 and SAPO-18. These molecular sieves have cages that are sufficiently large to accommodate aromatic intermediates while still allowing the diffusional transport of reactants and products into and out of the crystals through regularly interconnected window apertures. By complementing such morphological characteristics with appropriate levels of acid strength and acid density, working catalysts are produced. Extensive research in this area indicates that silicoaluminophosphates are currently more effective OTO catalysts than aluminosilicates. In particular, the control of the silica to alumina molar ratio is a key requirement for the use of aluminosilicates in OTO reactions. Nevertheless, aluminosilicate zeolites continue to be explored for use in OTO and appear to have yet undiscovered potential.

Chabazite is a naturally occurring zeolite with the approximate formula $Ca_6Al_{12}Si_{24}O_{72}$. Three synthetic forms of chabazite are described in "Zeolite Molecular Sieves", by D. W. Breck, published in 1973 by John Wiley & Sons, the complete disclosure of which is incorporated herein by specific reference. The three synthetic forms reported by Breck are Zeolite "K-G", described in J. Chem. Soc., p. 2822 (1956), Barrer et al; Zeolite D, described in British Patent No. 868,846 (1961); and Zeolite R, described in U.S. Pat. No. 3,030,181 (1962). Zeolite K-G zeolite has a silica:alumina mole ratio of 2.3:1 to 4.15:1, whereas zeolites D and R have silica:alumina mole ratios of 4.5:1 to 4.9:1 and 3.45:1 to 3.65:1, respectively.

U.S. Pat. No. 4,544,538, incorporated herein by reference, describes the synthesis of another synthetic form of chabazite, SSZ-13, using N-alkyl-3-quinuclidinol, N,N,N-trialkyl-1-adamantylammonium cations and/or N,N,N-trialkyl-exoaminonorbornane as a directing agent in a conventional $OH^-$ medium. According to the '538 patent, SSZ-13 typically has a silica to alumina molar ratio of 8 to 50, but it is stated that higher molar ratios can be obtained by varying the relative ratios of the reactants in the synthesis mixture and/or by treating the zeolite with chelating agents or acids to remove aluminum from the zeolite lattice. However, attempts to synthesize SSZ-13 in $OH^-$ media at silica to alumina molar ratios in excess of 100 have been unsuccessful and have produced ITQ-1 or SSZ-23, depending on the alkali metal cation present. Moreover, increasing the silica to alumina molar ratio of SSZ-13 by dealumination has met little or no success.

Significant work has been conducted on the use of SSZ-13 as a catalyst for MTO reactions. However, investigations to date have shown that the performance of SSZ-13 is always inferior to that of its silicoaluminophosphate analog, SAPO-34. See, for example, Yuen, L.-T., Zones, S. I., Harris, T. V., Gallegos, E. J., and Auroux, A., "Product Selectivity in Methanol to Hydrocarbon Conversion for Isostructural Compositions of AFI and CHA Molecular Sieves", Microporous Materials 2, 105–117 (1994) and Dahl, I. M., Mostad, H., Akporiaye, D., and Wendelbo, R., "Structural and Chemical Influences on the MTO Reaction: A Comparison of Chabazite and SAPO-34 as MTO Catalysts", Microporous and Mesoporous Materials 29, 185–190 (1999).

A silica crystalline molecular sieve having the CHA framework type has been hydrothermally synthesized using N,N,N-trimethyladamantylammonium in hydroxide form as the structure-directing agent at nearly neutral pH in the presence of fluoride. See Diaz-Cabanas, M-J, Barrett, P. A., and Camblor, M. A. "Synthesis and Structure of Pure $SiO_2$ Chabazite: the $SiO_2$ Polymorph with the Lowest Framework Density", Chem. Commun. 1881 (1998).

More recently, an aluminosilicate with the CHA framework type and having a silica to alumina molar ratio in excess of 100, such as from 150 to 2000, has been synthesized again in the presence of fluoride ions. See U.S. Patent Application Publication No. 2003/0176751 published Sep. 18, 2003 and incorporated herein by reference.

Molecular sieves of the AEI framework-type do not exist in nature. However, a number of aluminophosphates and silicoaluminophosphates having the AEI framework type have been synthesized, including SAPO-18, ALPO-18 and RUW-18. In addition, U.S. Pat. No. 5,958,370, incorporated herein by reference, discloses an aluminosilicate zeolite having an AEI framework-type and a silica to alumina molar ratio of 10 to 100. Aluminosilicates having a silica to alumina ratio greater than 100 and all-silica molecular sieves with an AEI framework-type have so far not been reported.

Regular crystalline molecular sieves, such as the AEI and CHA framework types, are built from structurally invariant building units, called Periodic Building Units, and are periodically ordered in three dimensions. However, disordered structures showing periodic ordering in less than three dimensions are also known. One such disordered structure is a disordered planar intergrowth in which the repeated building units from more than one framework type, e.g., both AEI and CHA, are present. In addition, for certain molecular sieves, the building units can exist in mirror image forms, which can result in stacking faults where a sequence of building units of one mirror image form intersects a sequence of building units of the opposite mirror image form.

U.S. Pat. No. 6,334,994, incorporated herein by reference, discloses a silicoaluminophosphate molecular sieve, referred to as RUW-19, which is said to be an AEI/CHA mixed phase composition. In particular, RUW-19 is reported as having peaks characteristic of both CHA and AEI framework type molecular sieves, except that the broad feature centered at about 16.9 (2θ) in RUW-19 replaces the pair of reflections centered at about 17.0 (2θ) in AEI materials and RUW-19 does not have the reflections associated with CHA materials centered at 2θ values of 17.8 and 24.8.

U.S. Patent Application Publication No. 2002/0165089, published Nov. 7, 2002 and incorporated herein by reference, discloses a silicoaluminophosphate molecular sieve comprising at least one intergrown phase of molecular sieves having AEI and CHA framework types, wherein said intergrown phase has an AEI/CHA ratio of from about 5/95 to 40/60 as determined by DIFFaX analysis, using the powder X-ray diffraction pattern of a calcined sample of said silicoaluminophosphate molecular sieve.

Phosphorus-free molecular sieves, such as aluminosilicates and silicas, comprising CHA/AEI intergrowths have so far not been reported.

SUMMARY

In one aspect, the invention resides in a crystalline material substantially free of framework phosphorus and comprising a CHA framework type molecular sieve with stacking faults or at least one intergrown phase of a CHA framework type molecular sieve and an AEI framework type molecular sieve, wherein said material, in its calcined, anhydrous form, has a composition involving the molar relationship:

$$(n)X_2O_3:YO_2,$$

wherein X is a trivalent element, such as aluminum, boron, iron, indium, and/or gallium; Y is a tetravalent element such as silicon, tin, titanium and/or germanium; and n is from 0 to about 0.5, conveniently from 0 to about 0.125, for example from about 0.001 to about 0.1, such as from about 0.0017 to about 0.02.

Conveniently, the calcined crystalline material contains from about 1 to about 100 ppm, for example from about 5 to about 50 ppm, such as from about 10 to about 20 ppm, by weight of a halide, preferably fluoride.

In a further aspect, the invention resides in a crystalline material which comprises at least a CHA framework type molecular sieve and which, in its as-synthesized form, contains in its intra-molecular structure a first directing agent for directing the synthesis of a CHA framework-type molecular sieve and a second directing agent for directing the synthesis of a AEI framework-type molecular sieve, said first and second directing agents being different.

In one embodiment, each of the first and second directing agents comprises a cyclic amine or ammonium compound. More particularly, the first directing agent comprises a multi-cyclic amine or ammonium compound and the second directing agent comprises a monocyclic amine or ammonium compound. Conveniently, the multi-cyclic amine or ammonium compound comprises a tricyclic or tetracyclic amine or ammonium compound, such as at least one of an N-alkyl-3-quinuclidinol, an N,N,N-trialkyl-exoaminonorbornane and an adamantylamine or ammonium compound, for example an N,N,N-trialkyl-1-adamantylammonium compound; typically an N,N,N-trimethyl-1-adamantylammonium compound. Conveniently, the monocyclic amine or ammonium compound comprises a substituted piperidine or piperidinium compound, for example a tetraalkylpiperidinium compound, typically an N,N-diethyl-2,6-dimethylpiperidinium compound.

In yet a further aspect, the invention resides in a method of synthesizing a crystalline material comprising a CHA framework type molecular sieve and having a composition involving the molar relationship:

$$(n)X_2O_3:YO_2,$$

wherein X is a trivalent element, Y is a tetravalent element and n is from 0 to about 0.5, the method comprising:

(a) preparing a reaction mixture capable of forming said material, said mixture comprising a source of water, a source of an oxide of a tetravalent element Y, and optionally a source of an oxide of a trivalent element X;

(b) maintaining said reaction mixture under conditions sufficient to form crystals of said crystalline material comprising stacking faults or at least one intergrown phase of a CHA framework type molecular sieve and an AEI framework type molecular sieve; and (c) recovering said crystalline material from (b).

Conveniently, said reaction mixture also comprises a halide or a halide-containing compound, such as a fluoride or a fluoride-containing compound.

Conveniently, said reaction mixture also comprises a first directing agent for directing the synthesis of a CHA framework-type molecular sieve and a second directing agent for directing the synthesis of a AEI framework-type molecular sieve.

Conveniently, said reaction mixture also comprises seed crystals. The seed crystals can be homostructural or heterostructural with said intergrown phase. In one embodiment, the seed crystals comprise a crystalline material having an AEI, CHA, OFF or LEV framework-type.

In still a further aspect, the invention resides in a process for producing olefins comprising the step of contacting an organic oxygenate compound under oxygenate conversion conditions with a catalyst comprising a porous crystalline material substantially free of framework phosphorus and comprising at least one intergrown phase of a CHA framework type and an AEI framework type.

It is to be understood that the term "in its calcined, anhydrous form" is used herein to refer to a material which has been heated in air at a temperature in excess of 400° C. for 0.1 to 10 hours without allowing the material to rehydrate.

DETAILED DESCRIPTION OF THE EMBODIMENTS

Figure 1A:
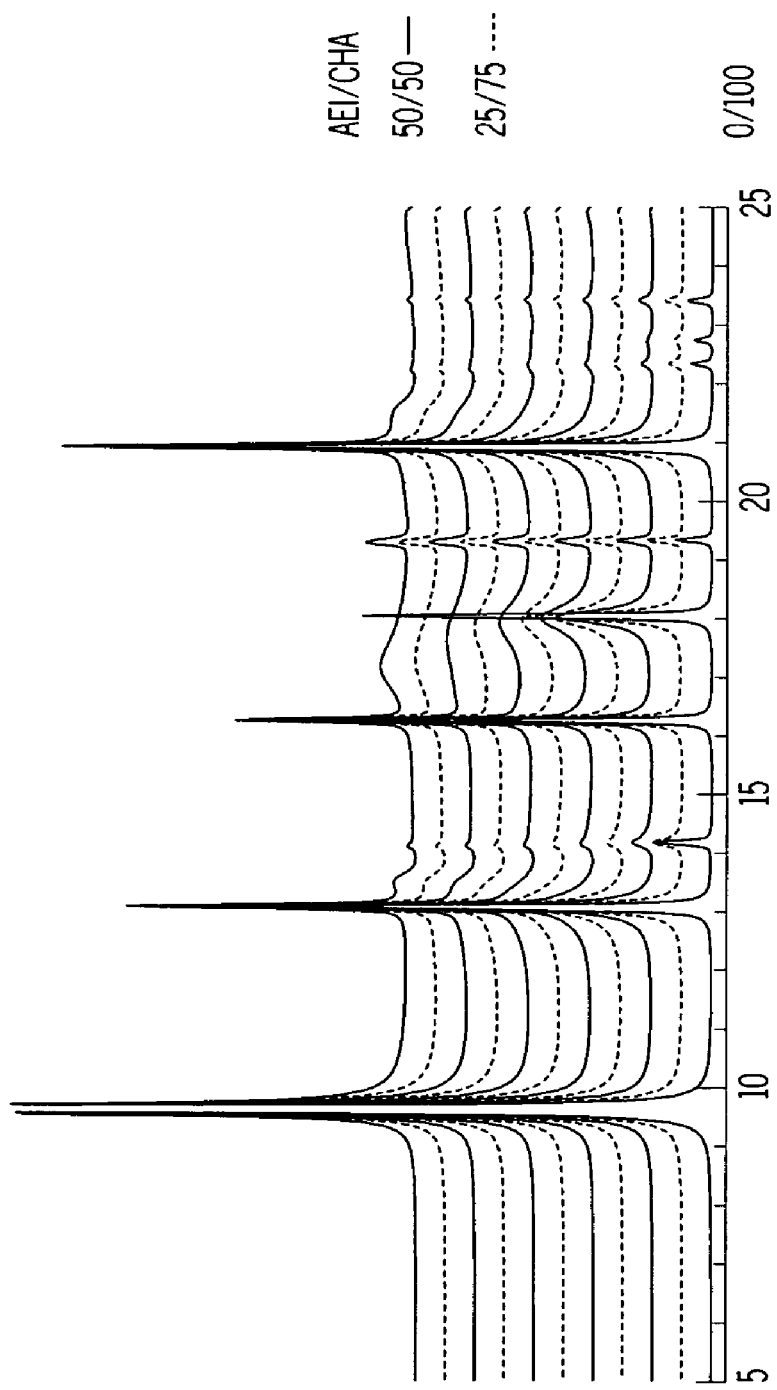
FIGS. 1a and 1b are DIFFaX simulated diffraction patterns for intergrown CHA/AEI zeolite phases having varying CHA/AEI ratios.

The present invention relates to a novel crystalline material that is substantially free of framework phosphorus and that comprises a CHA framework type molecular sieve with stacking faults or at least one intergrown phase of a CHA framework type molecular sieve and an AEI framework type molecular sieve. The invention also relates to the synthesis of this novel crystalline material in a halide, and particularly a fluoride, medium and to use of the material, such as in a process for the conversion of oxygenates, particularly methanol, to olefins, particularly ethylene and propylene.

Intergrown molecular sieve phases are disordered planar intergrowths of molecular sieve frameworks. Reference is directed to the "Catalog of Disordered Zeolite Structures", 2000 Edition, published by the Structure Commission of the International Zeolite Association and to the "Collection of Simulated XRD Powder Patterns for Zeolites", M. M. J. Treacy and J. B. Higgins, 2001 Edition, published on behalf of the Structure Commission of the International Zeolite Association for a detailed explanation on intergrown molecular sieve phases.

Regular crystalline solids are built from structurally invariant building units, called Periodic Building Units, and are periodically ordered in three dimensions. Structurally disordered structures show periodic ordering in dimensions less than three, i.e. in two, one or zero dimensions. This phenomenon is called stacking disorder of structurally invariant Periodic Building Units. Crystal structures built from Periodic Building Units are called end-member structures if periodic ordering is achieved in all three dimensions. Disordered structures are those where the stacking sequence of the Periodic Building Units deviates from periodic ordering up to statistical stacking sequences.

In the case of regular AEI and CHA framework type molecular sieves, the Periodic Building Unit is a double six ring layer. There are two types of layers "a" and "b", which are topologically identical except "b" is the mirror image of "a". When layers of the same type stack on top of one another, i.e. aaaaaaaa or bbbbbbbb, the framework type CHA is generated. When layers "a" and "b" alternate, ie, abababab, the framework type AEI is generated. Intergrown AEI/CHA molecular sieves comprise regions of CHA framework type sequences and regions of AEI framework type sequences. Each change from a CHA to an AEI framework type sequence results in a stacking fault. In addition, stacking faults can occur in a pure CHA phase material when a sequence of one mirror image layers intersects a sequence of the opposite mirror image layers, such as for example in aaaaaabbbbbbbb.

Analysis of intergrown molecular sieves, such as AEI/CHA intergrowths, can be effected by X-ray diffraction and in particular by comparing the observed patterns with calculated patterns generated using algorithms to simulate the effects of stacking disorder. DIFFaX is a computer program based on a mathematical model for calculating intensities from crystals containing planar faults (see M. M. J. Tracey et al., Proceedings of the Royal Chemical Society, London, A [1991], Vol. 433, pp. 499–520). DIFFaX is the simulation program selected by and available from the International Zeolite Association to simulate the XRD powder patterns for randomly intergrown phases of zeolites (see "Collection of Simulated XRD Powder Patterns for Zeolites" by M. M. J. Treacy and J. B. Higgins, 2001, Fourth Edition, published on behalf of the Structure Commission of the International Zeolite Association). It has also been used to theoretically study intergrown phases of AEI, CHA and KFI, as reported by K. P. Lillerud et al. in "Studies in Surface Science and Catalysis", 1994, Vol. 84, pp. 543–550.

Figure 1B:
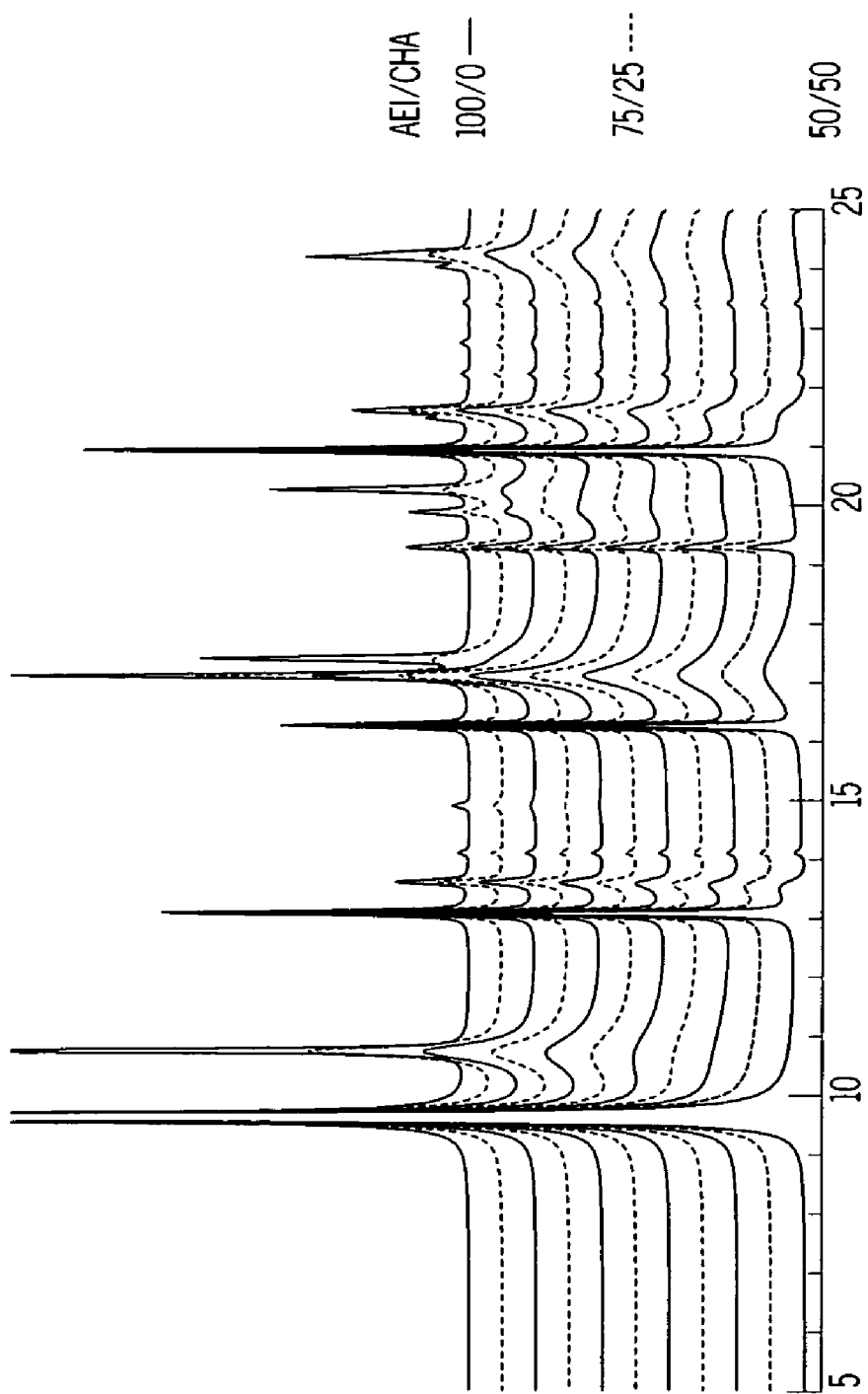

FIGS. 1a and 1b show the simulated diffraction patterns calculated by DIFFaX for single intergrown zeolite phases having various AEI/CHA ratios. These patterns were calculated using the input file given in Table 1 below, with each pattern being normalized to the highest peak of the entire set of simulated patterns, i.e. the peak at about 9.6 degrees 2θ for the 0/100 AEI/CHA pattern. Normalization of intensity values allows the intensity of an X-ray diffraction peak at a certain 2θ value to be compared between different diffraction patterns.

Where the crystalline material of the invention comprises an intergrowth of a CHA framework type molecular sieve and an AEI framework type molecular sieve, the material can possess a widely varying AEI/CHA ratio of from about 99:1 to about 1:99, such as from about 98:2 to about 2:98, for example from about 95:5 to 5:95. In one embodiment, where the material is to be used a catalyst in the conversion of oxygenates to olefins, the intergrowth is preferably CHA-rich and has AEI/CHA ratio ranging from about 5:95 to about 30:70. In addition, in some cases the intergrown material of the invention may comprise a plurality of intergrown phases each having a different AEI/CHA ratio. The relative amounts of AEI and CHA framework-type materials in the intergrowth of the invention can be determined by a variety of known techniques including transmission electron microscopy (TEM) and DIFFaX analysis, using the powder X-ray diffraction pattern of a calcined sample of the molecular sieve.

Where the crystalline material of the invention comprises a CHA framework type molecular sieve but with stacking faults, the presence of these stacking faults can readily be determined by transmission electron microscopy. It is to be appreciated that stacking faults may not be present in every crystal of the CHA material but generally will be present in at least 5%, such as at least 10%, of the crystals.

In its calcined and anhydrous form, the crystalline material of the present invention has a composition involving the molar relationship:

(n)X$_2$O$_3$:YO$_2$, wherein X is a trivalent element, such as aluminum, boron, iron, indium, and/or gallium, typically aluminum; Y is a tetravalent element, such as silicon, tin, titanium and/or germanium, typically silicon; and n is from 0 to about 0.5, conveniently from 0 to about 0.125, for example from about 0.001 to about 0.1, such as from about 0.0017 to about 0.02. Where a halide-containing compound has been used in the synthesis of the material, the calcined form of the material of the present invention is normally found to contain trace amounts, typically from about 1 to about 100 ppm, for example from about 5 to about 50 ppm, such as from about 10 to about 20 ppm, by weight of the halide, preferably fluoride.

In its as-synthesized form, the crystalline material of the present invention typically has a composition involving the molar relationship:

(n)X$_2$O$_3$:YO$_2$:(m)R:(x)F:z H$_2$O, wherein X, Y and n are as defined in the preceding paragraph, R is at least one organic directing agent and wherein m ranges from about 0.01 to about 2, such as from about 0.1 to about 1, z ranges from about 0.5 to about 100, such as from about 2 to about 20 and x ranges from about 0 to about 2, such as from about 0.01 to about 1. The R and F components, which are associated with the material as a result of their presence during crystallization, can be at least partly removed by post-crystallization methods hereinafter more particularly described. Typically, in its as-synthesized form, the intergrowth of the present invention contains only low levels of alkali metal, generally such that the combined amount of any potassium and sodium is less than 50% of the X$_2$O$_3$ on a molar basis. For this reason, after removal of the organic directing agent (R), the material generally exhibits catalytic activity without a preliminary ion-exchange step to remove alkali metal cations.

As will be discussed below, the least one organic directing agent (R) typically comprises at least one first organic directing agent for directing the synthesis of a CHA framework-type material and at least one second organic directing agent for directing the synthesis of an AEI framework-type material. It is found that these directing agents are typically retained intact in the intra-molecular structure of the molecular sieve product. Depending on the composition of the directing agents it will normally possible to determine the relative amounts of the different directing agents retained in the as-synthesized molecular sieve by analytical techniques, such as $^{13}$C MAS (magic-angle spinning) NMR. Thus, in a preferred embodiment, where the first organic directing agent is an N,N,N-trimethyl-1-adamantylammonium compound (TMAA) and the second organic directing agent is an N,N-diethyl-2,6-dimethylpiperidinium compound (DEDMP), the DEDMP exhibits peaks corresponding to the C nuclei in the CH$_3$ moieties in the 0 to 20 ppm range of the $^{13}$C MAS NMR spectrum, which peaks are not present in the $^{13}$C MAS NMR spectrum of the TMAA. This, by measuring the peak heights in the 0 to 20 ppm range of the $^{13}$C MAS NMR spectrum, the relative amounts of TMAA and DEDMP in the as-synthesized material can be determined. Preferably, the molar amount of AEI directing agent retained in the as-synthesized material to the total molar amount of AEI and CHA directing agent retained in the as-synthesized material is between 0.1 and 0.3.

To the extent desired and depending on the X$_2$O$_3$/YO$_2$ molar ratio of the material, any cations in the as-synthesized intergrowth can be replaced in accordance with techniques well known in the art, at least in part, by ion exchange with other cations. Preferred replacing cations include metal ions, hydrogen ions, hydrogen precursor, e.g., ammonium ions, and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIIB, VIIB and VIII of the Periodic Table of the Elements.

The intergrowth of the invention can be prepared from a reaction mixture containing a source of water, a source of an oxide of the tetravalent element Y, optionally a source of an oxide of the trivalent element X, at least one organic directing agent I as described below, and typically a halide or a halide-containing compound, such as a fluoride or a fluoride-containing compound, said reaction mixture having a composition, in terms of mole ratios of oxides, within the following ranges:

| Reactants | Useful | Typical |
|---|---|---|
| H$_2$O/YO$_2$ | 0.1 to 20 | 2 to 10 |
| Halide/YO$_2$ | 0 to 2 | 0.01 to 1 |
| R/YO$_2$ | 0.01 to 2 | 0.1 to 1 |
| X$_2$O$_3$/YO$_2$ | 0 to 0.5 | 0 to 0.1 |

Where the tetravalent element Y is silicon, suitable sources of silicon include silicates, e.g., tetraalkyl orthosilicates, fumed silica, such as Aerosil (available from Degussa), and aqueous colloidal suspensions of silica, for example that sold by E.I. du Pont de Nemours under the tradename Ludox. Where the trivalent element X is aluminum, suitable sources of aluminum include aluminum salts, especially water-soluble salts, such as aluminum nitrate, as well as hydrated aluminum oxides, such as boehmite and pseudoboehmite. Where the halide is fluoride, suitable sources of fluoride include hydrogen fluoride, although more benign sources of fluoride such as alkali metal fluorides and fluoride salts of the organic directing agent are preferred.

The at least one organic directing agent R used herein conveniently comprises a mixture of a plurality of different organic directing agents. Preferably, the mixture comprises at least one first organic directing agent for directing the synthesis of a CHA framework-type material and at least one second organic directing agent for directing the synthesis of an AEI framework-type material.

Suitable first organic directing agents for directing the synthesis of a CHA framework-type material include N,N,N-trimethyl-1-adamantammonium compounds, N,N,N-trimethyl-2-adamantammonium compounds, N,N,N-trimethylcyclohexylammonium compounds, N,N-dimethyl-3,3-dimethylpiperidinium compounds, N,N-methylethyl-3,3-dimethylpiperidinium compounds, N,N-dimethyl-2-methylpiperidinium compounds, 1,3,3,6,6-pentamethyl-6-azonio-bicyclo(3.2.1)octane compounds, N,N- dimethylcyclohexylamine, and the bi- and tri-cyclic nitrogen containing organic compounds cited in (1) *Zeolites and Related Microporous Materials*: State of the Art 1994, Studies of Surface Science and Catalysis, Vol. 84, p 29–36; in (2) *Novel Materials in Hetrogeneous Catalysis* (ed. Terry K. Baker & Larry L. Murrell), Chapter 2, p 14–24, May 1990, in (3) J. Am. Chem. Soc., 2000, 122, p 263–273 and (4) in U.S. Pat. Nos. 4,544,538 and 6,709,644. Suitable compounds include hydroxides and salts, such as halides, especially chlorides and fluorides.

Suitable second organic directing agents for directing the synthesis of an AEI framework-type material include N,N-diethyl-2,6-dimethylpiperdinium compounds (mixture or either of the cis/trans isomers), N,N-dimethyl-2,6-dimethylpiperdinium compounds (mixture or either of the cis/trans isomers), and the directing agents cited in J. Am. Chem. Soc., 2000, 122, p 263–273 and U.S. Pat. No. 5,958,370. Suitable compounds include hydroxides and salts, such as halides, especially chlorides and fluorides.

Conveniently, the molar ratio of the first organic directing agent to the second organic directing agent in the reaction mixture is from about 0.01 to about 100, such as from about 0.02 to about 50, for example from about 0.03 to about 33, such as from about 0.03 to about 3, for example from about 0.05 to about 0.3.

In one embodiment, the organic directing agent comprises a mixture of cyclic amines or ammonium compounds, particularly a mixture where one component is a multi-cyclic amine or ammonium compound and more particularly a mixture where one component is a multi-cyclic amine or ammonium compound and another component is a mono-cyclic amine or ammonium compound. Conveniently, the monocyclic amine or ammonium compound comprises a substituted piperidine or piperidinium compound, for example a tetraalkylpiperidinium compound, typically an N,N-diethyl-2,6dimethylpiperidinium compound. Conveniently, the multi-cyclic amine or ammonium compound comprises a tetracyclic amine or ammonium compound, such as an adamantylamine or ammonium compound, for example an N,N,N-trialkyl-1-adamantylammonium compound; typically an N,N,N-trimethyl-1-adamantylammonium compound. Thus the term multi-cyclic amine is used herein to include multi-cyclic compounds in which the N atom is external to the rings. Suitable ammonium compounds include hydroxides and salts, such as halides, especially chlorides.

Conveniently, the reaction mixture has a pH of about 4 to about 14, such as about 4 to about 10, for example about 6 to about 8.

Crystallization can be carried out at either static or stirred conditions in a suitable reactor vessel, such as for example, polypropylene jars or Teflon®-lined or stainless steel autoclaves, at a temperature of about 50° C. to about 300° C., such as about 135° C. to about 185° C., for a time sufficient for crystallization to occur. Formation of the crystalline product can take anywhere from around 30 minutes up to as much as 2 weeks, such as from about 45 minutes to about 240 hours, for example from about 1.0 to about 120 hours. The duration depends on the temperature employed, with higher temperatures typically requiring shorter hydrothermal treatments.

Synthesis of the new intergrowth may be facilitated by the presence of at least 0.1 ppm, such as at least 10 ppm, for example at least 100 ppm, conveniently at least 500 ppm of seed crystals based on total weight of the reaction mixture. The seed crystals can be homostructural with the crystalline material of the present invention, for example the product of a previous synthesis, or can be a heterostructural crystalline material, such as an AEI, LEV, OFF, CHA or ERI framework-type molecular sieve. Conveniently, the seed material is an AEI-type molecular sieve, and particularly an AEI-type aluminosilicate. The seeds may be added to the reaction mixture as a colloidal suspension in a liquid medium, such as water. The production of colloidal seed suspensions and their use in the synthesis of molecular sieves are disclosed in, for example, International Publication Nos. WO 00/06493 and WO 00/06494 published on Feb. 10, 2000 and incorporated herein by reference.

Typically, the crystalline product is formed in solution and can be recovered by standard means, such as by centrifugation or filtration. The separated product can also be washed, recovered by centrifugation or filtration and dried.

As a result of the crystallization process, the recovered crystalline product contains within its pores at least a portion of the organic directing agent used in the synthesis. In a preferred embodiment, activation is performed in such a manner that the organic directing agent is removed from the molecular sieve, leaving active catalytic sites within the microporous channels of the molecular sieve open for contact with a feedstock. The activation process is typically accomplished by calcining, or essentially heating the molecular sieve comprising the template at a temperature of from about 200° C. to about 800° C. in the presence of an oxygen-containing gas. In some cases, it may be desirable to heat the molecular sieve in an environment having a low or zero oxygen concentration. This type of process can be used for partial or complete removal of the organic directing agent from the intracrystalline pore system. In other cases, particularly with smaller organic directing agents, complete or partial removal from the sieve can be accomplished by conventional desorption processes.

Once the intergrown crystalline material of the invention has been synthesized, it can be formulated into a catalyst composition by combination with other materials, such as binders and/or matrix materials, that provide additional hardness or catalytic activity to the finished catalyst.

Materials which can be blended with the intergrown crystalline material of the invention can be various inert or catalytically active materials. These materials include compositions such as kaolin and other clays, various forms of rare earth metals, other non-zeolite catalyst components, zeolite catalyst components, alumina or alumina sol, titania, zirconia, quartz, silica or silica sol, and mixtures thereof. These components are also effective in reducing overall catalyst cost, acting as a thermal sink to assist in heat shielding the catalyst during regeneration, densifying the catalyst and increasing catalyst strength. When blended with such components, the amount of intergrown crystalline material contained in the final catalyst product ranges from 10 to 90 weight percent of the total catalyst, preferably 20 to 80 weight percent of the total catalyst.

The intergrown crystalline material described herein can be used to dry gases and liquids; for selective molecular separation based on size and polar properties; as an ion-exchanger; as a chemical carrier; in gas chromatography; and as a catalyst in organic conversion reactions. Examples of suitable catalytic uses of the intergrown crystalline material described herein include (a) hydrocracking of heavy petroleum residual feedstocks, cyclic stocks and other hydrocrackate charge stocks, normally in the presence of a hydrogenation component selected from Groups 6 and 8 to 10 of the Periodic Table of Elements; (b) dewaxing, including isomerization dewaxing, to selectively remove straight chain paraffins from hydrocarbon feedstocks typically boiling above 177° C., including raffinates and lubricating oil basestocks; (c) catalytic cracking of hydrocarbon feedstocks, such as naphthas, gas oils and residual oils, normally in the presence of a large pore cracking catalyst, such as zeolite Y; (d) oligomerization of straight and branched chain olefins having from about 2 to 21, preferably 2 to 5 carbon atoms, to produce medium to heavy olefins which are useful for both fuels, i.e., gasoline or a gasoline blending stock, and chemicals; (e) isomerization of olefins, particularly olefins having 4 to 6 carbon atoms, and especially normal butene to produce iso-olefins; (f) upgrading of lower alkanes, such as methane, to higher hydrocarbons, such as ethylene and benzene; (g) disproportionation of alkylaromatic hydrocarbons, such as toluene, to produce dialkylaromatic hydrocarbons, such as xylenes; (h) alkylation of aromatic hydrocarbons, such as benzene, with olefins, such as ethylene and propylene to produce ethylbenzene and cumene; (i) isomerization of dialkylaromatic hydrocarbons, such as xylenes, (j) catalytic reduction of nitrogen oxides and (k) synthesis of monoalkylamines and dialkylamines.

In particular, the intergrown crystalline material described herein is useful as a catalyst in the conversion of oxygenates to one or more olefins, particularly ethylene and propylene. As used herein, the term "oxygenates" is defined to include, but is not necessarily limited to aliphatic alcohols, ethers, carbonyl compounds (aldehydes, ketones, carboxylic acids, carbonates, and the like), and also compounds containing hetero-atoms, such as, halides, mercaptans, sulfides, amines, and mixtures thereof. The aliphatic moiety will normally contain from about 1 to about 10 carbon atoms, such as from about 1 to about 4 carbon atoms.

Representative oxygenates include lower straight chain or branched aliphatic alcohols, their unsaturated counterparts, and their nitrogen, halogen and sulfur analogues. Examples of suitable oxygenate compounds include methanol; ethanol; n-propanol; isopropanol; $C_4$–$C_{10}$ alcohols; methyl ethyl ether; dimethyl ether; diethyl ether; di-isopropyl ether; methyl mercaptan; methyl sulfide; methyl amine; ethyl mercaptan; di-ethyl sulfide; di-ethyl amine; ethyl chloride; formaldehyde; di-methyl carbonate; di-methyl ketone; acetic acid; n-alkyl amines, n-alkyl halides, n-alkyl sulfides having n-alkyl groups of comprising the range of from about 3 to about 10 carbon atoms; and mixtures thereof. Particularly suitable oxygenate compounds are methanol, dimethyl ether, or mixtures thereof, most preferably methanol. As used herein, the term "oxygenate" designates only the organic material used as the feed. The total charge of feed to the reaction zone may contain additional compounds, such as diluents.

In the present oxygenate conversion process, a feedstock comprising an organic oxygenate, optionally with one or more diluents, is contacted in the vapor phase in a reaction zone with a catalyst comprising the molecular sieve of the present invention at effective process conditions so as to produce the desired olefins. Alternatively, the process may be carried out in a liquid or a mixed vapor/liquid phase. When the process is carried out in the liquid phase or a mixed vapor/liquid phase, different conversion rates and selectivities of feedstock-to-product may result depending upon the catalyst and the reaction conditions.

When present, the diluent(s) is generally non-reactive to the feedstock or molecular sieve catalyst composition and is typically used to reduce the concentration of the oxygenate in the feedstock. Non-limiting examples of suitable diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred. Diluent(s) may comprise from about 1 mol % to about 99 mol % of the total feed mixture.

The temperature employed in the oxygenate conversion process may vary over a wide range, such as from about 200° C. to about 1000° C., for example from about 250° C. to about 800° C., including from about 250° C. to about 750° C., conveniently from about 300° C. to about 650° C., typically from about 350° C. to about 600° C. and particularly from about 400° C. to about 600° C.

Light olefin products will form, although not necessarily in optimum amounts, at a wide range of pressures, including but not limited to autogenous pressures and pressures in the range of from about 0.1 kPa to about 10 MPa. Conveniently, the pressure is in the range of from about 7 kPa to about 5 MPa, such as in the range of from about 50 kPa to about 1 MPa. The foregoing pressures are exclusive of diluent, if any is present, and refer to the partial pressure of the feedstock as it relates to oxygenate compounds and/or mixtures thereof. Lower and upper extremes of pressure may adversely affect selectivity, conversion, coking rate, and/or reaction rate; however, light olefins such as ethylene still may form.

The process should be continued for a period of time sufficient to produce the desired olefin products. The reaction time may vary from tenths of seconds to a number of hours. The reaction time is largely determined by the reaction temperature, the pressure, the catalyst selected, the weight hourly space velocity, the phase (liquid or vapor) and the selected process design characteristics.

A wide range of weight hourly space velocities (WHSV) for the feedstock will function in the present process. WHSV is defined as weight of feed (excluding diluent) per hour per weight of a total reaction volume of molecular sieve catalyst (excluding inerts and/or fillers). The WHSV generally should be in the range of from about 0.01 $hr^{-1}$ to about 500 $hr^{-1}$, such as in the range of from about 0.5 $hr^{-1}$ to about 300 $hr^{-1}$, for example in the range of from about 0.1 $hr^{-1}$ to about 200 $hr^{-1}$.

A practical embodiment of a reactor system for the oxygenate conversion process is a circulating fluid bed reactor with continuous regeneration, similar to a modern fluid catalytic cracker. Fixed beds are generally not preferred for the process because oxygenate to olefin conversion is a highly exothermic process which requires several stages with intercoolers or other cooling devices. The reaction also results in a high pressure drop due to the production of low pressure, low density gas.

Because the catalyst must be regenerated frequently, the reactor should allow easy removal of a portion of the catalyst to a regenerator, where the catalyst is subjected to a regeneration medium, such as a gas comprising oxygen, for example air, to burn off coke from the catalyst, which restores the catalyst activity. The conditions of temperature, oxygen partial pressure, and residence time in the regenerator should be selected to achieve a coke content on regenerated catalyst of less than about 0.5 wt %. At least a portion of the regenerated catalyst should be returned to the reactor.

In one embodiment, prior to being used to convert oxygenate to olefins, the catalyst is pretreated with dimethyl ether, a $C_2$–$C_4$ aldehyde composition and/or a $C_4$–$C_7$ olefin composition to form an integrated hydrocarbon co-catalyst within the porous framework of the intergrown molecular sieve. Desirably, the pretreatment is conducted at a temperature of at least 10° C., such as at least 25° C., for example at least 50° C., higher than the temperature used for the oxygenate reaction zone and is arranged to produce at least 0.1 wt %, such as at least 1 wt %, for example at least about 5 wt % of the integrated hydrocarbon co-catalyst, based on total weight of the molecular sieve. Such preliminary treating to increase the carbon content of the molecular sieve is known as "pre-pooling" and is further described in U.S. application Ser. Nos. 10/712,668, 10/712,952 and 10/712,953 all of which were filed Nov. 12, 2003 and are incorporated herein by reference.

The invention will now be more particularly described with reference to the following Examples and the accompanying drawings. In the Examples, the X-ray diffraction data were collected with several types of instruments:

Philips XRD shall hereinafter refer to X-ray diffraction data collected with a Philips powder X-Ray Diffractometer, equipped with a scintillation detector with graphite monochromator, using copper K-alpha radiation. The diffraction data were recorded by step-scanning at 0.02 degrees of two-theta, where theta is the Bragg angle, and a counting time of 1 second for each step. The interplanar spacings, d's, were calculated in Angstrom units, and the relative intensities of the lines, $I/I_o$, where $I_o$ is the intensity of the strongest line, above background were determined by integrating the peak intensities.

Synchrotron XRD shall hereinafter refer to powder X-ray diffraction data collected at Brookhaven National Labs on beamline X10B with a monochromatic radiation wavelength of 0.8695 Å using Debye-Scherrer geometry. Samples were first calcined in air at 600° C. for 3 hours to remove the template. The calcined samples were then sealed in 2 mm outside diameter quartz capillary tubes while out-gassing at 300° C. under vacuum (<0.1 torr). The diffraction data were recorded by step-scanning at 0.01 degrees two-theta, where theta is the Bragg angle. The counting time was automatically adjusted for each step during the measurement so that a separate beam monitor detector registered 30,000 counts (typically 5.2–5.4 seconds). The interplanar spacings, d's, were calculated in Angstrom units, and the relative intensities of the lines, I/Io, where Io is the intensity of the strongest line, above background were determined by integrating the peak intensities.

Scintag XRD shall hereinafter refer to X-ray diffraction data collected with a Scintag X2 X-Ray Diffractometer equipped with a Peltier-cooled solid state detector, using copper K-alpha radiation. The diffraction data were recorded by step-scanning at 0.02 degrees two-theta, where theta is the Bragg angle, and a counting time of 0.3 second for each step. The interplanar spacing, d's, were calculated in Angstrom units, and the relative intensities of the lines, I/Io, where Io is the intensity of the strongest line, above background were determined by integrating the peak intensities.

X-ray diffraction data for the calcined samples was obtained by subjecting the as-synthesized product to the following calcination procedure. About 2 grams of the as-synthesized product were heated from room temperature to 200° C. under a flow of nitrogen at a rate of 2° C. per minute. The temperature was held at 200° C. for 30 minutes and then the sample was heated from 200° C. to 650° C. under nitrogen again at a rate of 2° C. per minute. The sample was held at 650° C. under nitrogen for 5–8 hours, whereafter the nitrogen was then replaced by air and the sample was kept at 650° C. under air for 3 hours. The sample was then cooled to 200° C. and kept at 200° C. to prevent hydration. The hot sample was then transferred into the XRD sample cup and was covered by Mylar foil to prevent hydration.

DIFFaX analysis was used to determine the AEI/CHA ratio of the molecular sieves. For DIFFaX analysis, powder XRD diffraction patterns for varying ratios of AEI/CHA were generated using the DIFFaX program available from the International Zeolite Association (see also M. M. J. Treacy et al., Proceedings of the Royal Chemical Society, London, A (1991), Vol. 433, pp. 499–520 "Collection of Simulated XRD Powder Patterns for Zeolites" by M. M. J. Treacy and J. B. Higgins, 2001, Fourth Edition, published on behalf of the Structure Commission of the International Zeolite Association). Table 1 gives the DIFFaX input file used to simulate the XRD diffraction pattern of a 50/50 intergrowth. For the purposes of this analysis, calculations were based on a random distribution of the layers. Such calculations are used for statistical purposes only, and do not mean that the true nature of the material is necessarily random.

TABLE 1

{Data File for Random AEI-CHA Intergrowths - Starting from an All Si AEI Unit Cell}

{This file is for a 50% probability of a transition generating CHA-type cages and a 50% probability of a transition generating AEI-type cages}

| INSTRUMENTAL | | | | | {Header for instrumental section} |
|---|---|---|---|---|---|
| X-RAY | | | | | {Simulate X-ray diffraction} |
| 1.54056 | | | | | {X-ray wavelength} |
| PSEUDO-VOIGT | 0.1 | −0.036 | 0.009 | 0.6 | {Instrumental broadening (much slower)} |
| STRUCTURAL | | | | | {Header for structural section} |
| 13.5155 | 12.5460 | 18.3306 | | 90. | {unit cell coordinates a, b, c, and gamma} |
| UNKNOWN | | | | | {P1 - all coordinates given} |
| 2 | | | | | {Layer 1 & Layer 2} |
| infinite | | | | | {Layers are very wide in the a–b plane} |

| | | LAYER 1 | | | | |
|---|---|---|---|---|---|---|
| | | NONE | | | | |
| Si4+ | 3 | 0.88217 | 0.04597 | −0.16618 | 1.50 | 1.0 |
| Si4+ | 5 | 0.11783 | 0.04597 | −0.16618 | 1.50 | 1.0 |
| Si4+ | 11 | 0.38217 | 0.54597 | −0.16618 | 1.50 | 1.0 |
| Si4+ | 13 | 0.61783 | 0.54597 | −0.16618 | 1.50 | 1.0 |
| O 2− | 91 | 0.00000 | 0.02575 | −0.16208 | 3.00 | 1.0 |
| O 2− | 95 | 0.50000 | 0.52575 | −0.16208 | 3.00 | 1.0 |

TABLE 1-continued

{Data File for Random AEI-CHA Intergrowths - Starting from an All Si AEI Unit Cell}

{This file is for a 50% probability of a transition generating CHA-type cages and a 50% probability of a transition generating AEI-type cages}

| | | | | | | |
|---|---|---|---|---|---|---|
| O 2− | 59 | 0.67484 | 0.44369 | −0.13307 | 3.00 | 1.0 |
| O 2− | 61 | 0.32516 | 0.44369 | −0.13307 | 3.00 | 1.0 |
| O 2− | 51 | 0.17484 | 0.94369 | −0.13307 | 3.00 | 1.0 |
| O 2− | 53 | 0.82516 | 0.94369 | −0.13307 | 3.00 | 1.0 |
| O 2− | 99 | 0.14671 | 0.15098 | −0.11991 | 3.00 | 1.0 |
| O 2− | 101 | 0.85329 | 0.15098 | −0.11991 | 3.00 | 1.0 |
| O 2− | 107 | 0.64671 | 0.65098 | −0.11991 | 3.00 | 1.0 |
| O 2− | 109 | 0.35329 | 0.65098 | −0.11991 | 3.00 | 1.0 |
| O 2− | 123 | 0.81919 | 0.34223 | −0.06605 | 3.00 | 1.0 |
| O 2− | 125 | 0.18081 | 0.34223 | −0.06605 | 3.00 | 1.0 |
| O 2− | 115 | 0.31919 | 0.84223 | −0.06605 | 3.00 | 1.0 |
| O 2− | 117 | 0.68081 | 0.84223 | −0.06605 | 3.00 | 1.0 |
| O 2− | 81 | 0.00000 | 0.26532 | −0.06597 | 3.00 | 1.0 |
| O 2− | 85 | 0.50000 | 0.76532 | −0.06597 | 3.00 | 1.0 |
| Si4+ | 17 | 0.88446 | 0.23517 | −0.05737 | 1.50 | 1.0 |
| Si4+ | 23 | 0.11554 | 0.23517 | −0.05737 | 1.50 | 1.0 |
| Si4+ | 25 | 0.38446 | 0.73517 | −0.05737 | 1.50 | 1.0 |
| Si4+ | 31 | 0.61554 | 0.73517 | −0.05737 | 1.50 | 1.0 |
| Si4+ | 43 | 0.71381 | 0.40077 | −0.05514 | 1.50 | 1.0 |
| Si4+ | 45 | 0.28619 | 0.40077 | −0.05514 | 1.50 | 1.0 |
| Si4+ | 35 | 0.21381 | 0.90077 | −0.05514 | 1.50 | 1.0 |
| Si4+ | 37 | 0.78619 | 0.90077 | −0.05514 | 1.50 | 1.0 |
| O 2− | 75 | 0.63494 | 0.31721 | −0.02183 | 3.00 | 1.0 |
| O 2− | 77 | 0.36506 | 0.31721 | −0.02183 | 3.00 | 1.0 |
| O 2− | 67 | 0.13494 | 0.81721 | −0.02183 | 3.00 | 1.0 |
| O 2− | 69 | 0.86506 | 0.81721 | −0.02183 | 3.00 | 1.0 |
| O 2− | 137 | 0.22748 | 0.00000 | 0.00000 | 3.00 | 1.0 |
| O 2− | 139 | 0.77252 | 0.00000 | 0.00000 | 3.00 | 1.0 |
| O 2− | 141 | 0.72748 | 0.50000 | 0.00000 | 3.00 | 1.0 |
| O 2− | 143 | 0.27252 | 0.50000 | 0.00000 | 3.00 | 1.0 |
| O 2− | 65 | 0.13494 | 0.18279 | 0.02183 | 3.00 | 1.0 |
| O 2− | 71 | 0.86506 | 0.18279 | 0.02183 | 3.00 | 1.0 |
| O 2− | 73 | 0.63494 | 0.68279 | 0.02183 | 3.00 | 1.0 |
| O 2− | 79 | 0.36506 | 0.68279 | 0.02183 | 3.00 | 1.0 |
| Si4+ | 33 | 0.21381 | 0.09923 | 0.05514 | 1.50 | 1.0 |
| Si4+ | 39 | 0.78619 | 0.09923 | 0.05514 | 1.50 | 1.0 |
| Si4+ | 41 | 0.71381 | 0.59923 | 0.05514 | 1.50 | 1.0 |
| Si4+ | 47 | 0.28619 | 0.59923 | 0.05514 | 1.50 | 1.0 |
| Si4+ | 27 | 0.38446 | 0.26483 | 0.05737 | 1.50 | 1.0 |
| Si4+ | 29 | 0.61554 | 0.26483 | 0.05737 | 1.50 | 1.0 |
| Si4+ | 19 | 0.88446 | 0.76483 | 0.05737 | 1.50 | 1.0 |
| Si4+ | 21 | 0.11554 | 0.76483 | 0.05737 | 1.50 | 1.0 |
| O 2− | 87 | 0.50000 | 0.23468 | 0.06597 | 3.00 | 1.0 |
| O 2− | 83 | 0.00000 | 0.73468 | 0.06597 | 3.00 | 1.0 |
| O 2− | 113 | 0.31919 | 0.15777 | 0.06605 | 3.00 | 1.0 |
| O 2− | 119 | 0.68081 | 0.15777 | 0.06605 | 3.00 | 1.0 |
| O 2− | 121 | 0.81919 | 0.65777 | 0.06605 | 3.00 | 1.0 |
| O 2− | 127 | 0.18081 | 0.65777 | 0.06605 | 3.00 | 1.0 |
| O 2− | 105 | 0.64671 | 0.34902 | 0.11991 | 3.00 | 1.0 |
| O 2− | 111 | 0.35329 | 0.34902 | 0.11991 | 3.00 | 1.0 |
| O 2− | 97 | 0.14671 | 0.84902 | 0.11991 | 3.00 | 1.0 |
| O 2− | 103 | 0.85329 | 0.84902 | 0.11991 | 3.00 | 1.0 |
| O 2− | 49 | 0.17484 | 0.05631 | 0.13307 | 3.00 | 1.0 |
| O 2− | 55 | 0.82516 | 0.05631 | 0.13307 | 3.00 | 1.0 |
| O 2− | 57 | 0.67484 | 0.55631 | 0.13307 | 3.00 | 1.0 |
| O 2− | 63 | 0.32516 | 0.55631 | 0.13307 | 3.00 | 1.0 |
| O 2− | 93 | 0.50000 | 0.47425 | 0.16208 | 3.00 | 1.0 |
| O 2− | 89 | 0.00000 | 0.97425 | 0.16208 | 3.00 | 1.0 |
| Si4+ | 9 | 0.38217 | 0.45403 | 0.16618 | 1.50 | 1.0 |
| Si4+ | 15 | 0.61783 | 0.45403 | 0.16618 | 1.50 | 1.0 |
| Si4+ | 1 | 0.88217 | 0.95403 | 0.16618 | 1.50 | 1.0 |
| Si4+ | 7 | 0.11783 | 0.95403 | 0.16618 | 1.50 | 1.0 |
| O 2− | 133 | 0.34894 | 0.43713 | 0.25000 | 3.00 | 1.0 |
| O 2− | 136 | 0.65106 | 0.43713 | 0.25000 | 3.00 | 1.0 |
| O 2− | 129 | 0.84894 | 0.93713 | 0.25000 | 3.00 | 1.0 |
| O 2− | 132 | 0.15106 | 0.93713 | 0.25000 | 3.00 | 1.0 |
| | | | LAYER 2 NONE | | | |
| Si4+ | 12 | 0.61783 | 0.45403 | −0.16618 | 1.50 | 1.0 |
| Si4+ | 14 | 0.38217 | 0.45403 | −0.16618 | 1.50 | 1.0 |
| Si4+ | 4 | 0.11783 | 0.95403 | −0.16618 | 1.50 | 1.0 |
| Si4+ | 6 | 0.88217 | 0.95403 | −0.16618 | 1.50 | 1.0 |
| O 2− | 96 | 0.50000 | 0.47425 | −0.16208 | 3.00 | 1.0 |

TABLE 1-continued

{Data File for Random AEI-CHA Intergrowths - Starting from an All Si AEI Unit Cell}

{This file is for a 50% probability of a transition generating CHA-type cages and a 50% probability of a transition generating AEI-type cages}

| | | | | | |
|---|---|---|---|---|---|
| O 2− | 92 | 0.00000 | 0.97425 | −0.16208 | 3.00 | 1.0 |
| O 2− | 52 | 0.82516 | 0.05631 | −0.13307 | 3.00 | 1.0 |
| O 2− | 54 | 0.17484 | 0.05631 | −0.13307 | 3.00 | 1.0 |
| O 2− | 60 | 0.32516 | 0.55631 | −0.13307 | 3.00 | 1.0 |
| O 2− | 62 | 0.67484 | 0.55631 | −0.13307 | 3.00 | 1.0 |
| O 2− | 108 | 0.35329 | 0.34902 | −0.11991 | 3.00 | 1.0 |
| O 2− | 110 | 0.64671 | 0.34902 | −0.11991 | 3.00 | 1.0 |
| O 2− | 100 | 0.85329 | 0.84902 | −0.11991 | 3.00 | 1.0 |
| O 2− | 102 | 0.14671 | 0.84902 | −0.11991 | 3.00 | 1.0 |
| O 2− | 116 | 0.68081 | 0.15777 | −0.06605 | 3.00 | 1.0 |
| O 2− | 118 | 0.31919 | 0.15777 | −0.06605 | 3.00 | 1.0 |
| O 2− | 124 | 0.18081 | 0.65777 | −0.06605 | 3.00 | 1.0 |
| O 2− | 126 | 0.81919 | 0.65777 | −0.06605 | 3.00 | 1.0 |
| O 2− | 86 | 0.50000 | 0.23468 | −0.06597 | 3.00 | 1.0 |
| O 2− | 82 | 0.00000 | 0.73468 | −0.06597 | 3.00 | 1.0 |
| Si4+ | 26 | 0.61554 | 0.26483 | −0.05737 | 1.50 | 1.0 |
| Si4+ | 32 | 0.38446 | 0.26483 | −0.05737 | 1.50 | 1.0 |
| Si4+ | 18 | 0.11554 | 0.76483 | −0.05737 | 1.50 | 1.0 |
| Si4+ | 24 | 0.88446 | 0.76483 | −0.05737 | 1.50 | 1.0 |
| Si4+ | 36 | 0.78619 | 0.09923 | −0.05514 | 1.50 | 1.0 |
| Si4+ | 38 | 0.21381 | 0.09923 | −0.05514 | 1.50 | 1.0 |
| Si4+ | 44 | 0.28619 | 0.59923 | −0.05514 | 1.50 | 1.0 |
| Si4+ | 46 | 0.71381 | 0.59923 | −0.05514 | 1.50 | 1.0 |
| O 2− | 68 | 0.86506 | 0.18279 | −0.02183 | 3.00 | 1.0 |
| O 2− | 70 | 0.13494 | 0.18279 | −0.02183 | 3.00 | 1.0 |
| O 2− | 76 | 0.36506 | 0.68279 | −0.02183 | 3.00 | 1.0 |
| O 2− | 78 | 0.63494 | 0.68279 | −0.02183 | 3.00 | 1.0 |
| O 2− | 138 | 0.77252 | 0.00000 | 0.00000 | 3.00 | 1.0 |
| O 2− | 140 | 0.22748 | 0.00000 | 0.00000 | 3.00 | 1.0 |
| O 2− | 142 | 0.27252 | 0.50000 | 0.00000 | 3.00 | 1.0 |
| O 2− | 144 | 0.72748 | 0.50000 | 0.00000 | 3.00 | 1.0 |
| O 2− | 74 | 0.36506 | 0.31721 | 0.02183 | 3.00 | 1.0 |
| O 2− | 80 | 0.63494 | 0.31721 | 0.02183 | 3.00 | 1.0 |
| O 2− | 66 | 0.86506 | 0.81721 | 0.02183 | 3.00 | 1.0 |
| O 2− | 72 | 0.13494 | 0.81721 | 0.02183 | 3.00 | 1.0 |
| Si4+ | 42 | 0.28619 | 0.40077 | 0.05514 | 1.50 | 1.0 |
| Si4+ | 48 | 0.71381 | 0.40077 | 0.05514 | 1.50 | 1.0 |
| Si4+ | 34 | 0.78619 | 0.90077 | 0.05514 | 1.50 | 1.0 |
| Si4+ | 40 | 0.21381 | 0.90077 | 0.05514 | 1.50 | 1.0 |
| Si4+ | 20 | 0.11554 | 0.23517 | 0.05737 | 1.50 | 1.0 |
| Si4+ | 22 | 0.88446 | 0.23517 | 0.05737 | 1.50 | 1.0 |
| Si4+ | 28 | 0.61554 | 0.73517 | 0.05737 | 1.50 | 1.0 |
| Si4+ | 30 | 0.38446 | 0.73517 | 0.05737 | 1.50 | 1.0 |
| O 2− | 84 | 0.00000 | 0.26532 | 0.06597 | 3.00 | 1.0 |
| O 2− | 88 | 0.50000 | 0.76532 | 0.06597 | 3.00 | 1.0 |
| O 2− | 122 | 0.18081 | 0.34223 | 0.06605 | 3.00 | 1.0 |
| O 2− | 128 | 0.81919 | 0.34223 | 0.06605 | 3.00 | 1.0 |
| O 2− | 114 | 0.68081 | 0.84223 | 0.06605 | 3.00 | 1.0 |
| O 2− | 120 | 0.31919 | 0.84223 | 0.06605 | 3.00 | 1.0 |
| O 2− | 98 | 0.85329 | 0.15098 | 0.11991 | 3.00 | 1.0 |
| O 2− | 104 | 0.14671 | 0.15098 | 0.11991 | 3.00 | 1.0 |
| O 2− | 106 | 0.35329 | 0.65098 | 0.11991 | 3.00 | 1.0 |
| O 2− | 112 | 0.64671 | 0.65098 | 0.11991 | 3.00 | 1.0 |
| O 2− | 58 | 0.32516 | 0.44369 | 0.13307 | 3.00 | 1.0 |
| O 2− | 64 | 0.67484 | 0.44369 | 0.13307 | 3.00 | 1.0 |
| O 2− | 50 | 0.82516 | 0.94369 | 0.13307 | 3.00 | 1.0 |
| O 2− | 56 | 0.17484 | 0.94369 | 0.13307 | 3.00 | 1.0 |
| O 2− | 90 | 0.00000 | 0.02575 | 0.16208 | 3.00 | 1.0 |
| O 2− | 94 | 0.50000 | 0.52575 | 0.16208 | 3.00 | 1.0 |
| Si4+ | 2 | 0.11783 | 0.04597 | 0.16618 | 1.50 | 1.0 |
| Si4+ | 8 | 0.88217 | 0.04597 | 0.16618 | 1.50 | 1.0 |
| Si4+ | 10 | 0.61783 | 0.54597 | 0.16618 | 1.50 | 1.0 |
| Si4+ | 16 | 0.38217 | 0.54597 | 0.16618 | 1.50 | 1.0 |
| O 2− | 130 | 0.15106 | 0.06287 | 0.25000 | 3.00 | 1.0 |
| O 2− | 131 | 0.84894 | 0.06287 | 0.25000 | 3.00 | 1.0 |
| O 2− | 134 | 0.65106 | 0.56287 | 0.25000 | 3.00 | 1.0 |
| O 2− | 135 | 0.34894 | 0.56287 | 0.25000 | 3.00 | 1.0 |

| | |
|---|---|
| STACKING | {Header for stacking description} |
| recursive | {Statistical ensemble} |

TABLE 1-continued

{Data File for Random AEI-CHA Intergrowths - Starting from an All Si AEI Unit Cell}

{This file is for a 50% probability of a transition generating CHA-type cages and a 50% probability of a transition generating AEI-type cages}

| infinite TRANSITIONS | | | | {Infinite number of layers} {Header for stacking transition data} |
|---|---|---|---|---|
| {Transitions from layer 1} | | | | |
| 0.50 | 0.0 | −0.0810 | 0.5 | {layer 1 to layer 1: CHA-type cages} |
| 0.50 | 0.0 | 0.0 | 0.5 | {layer 1 to layer 2: AEI-type cages} |
| {Transitions from layer 2} | | | | |
| 0.50 | 0.0 | 0.0 | 0.5 | {layer 2 to layer 1: AEI-type cages} |
| 0.50 | 0.0 | 0.0810 | 0.5 | {layer 2 to layer 2: CHA-type cages} |

FIGS. 1a and 1b show the simulated diffraction patterns calculated by DIFFaX for single intergrown zeolite phases having various AEI/CHA ratios, normalized to the highest peak of the entire set, i.e. the peak at about 9.6 2θ for the 100% CHA case which was set to 100. The diffractograms were simulated using the following parameter settings: all Si AEI_CHA λ=1.54056, PSEUDO-VOIGT 0.1–0.036; line broadening: 0.009: 0.6. A non-linear least-squares procedure ("DIFFaX Analysis") was then used to refine the contribution of one or more phases, and of the background and the 2θ shift required to fit the experimental profile. An intergrowth sensitive region (see e.g. FIG. 3) was always chosen in order to maximize the sensitivity of the calculations. Alternatively, a manual trial-and-error fit can be performed for identifying the type and magnitude of the contributing phases, the background counts and the 2θ shift. For materials characterized by the presence of more than one intergrown phase, the contribution of AEI and CHA was calculated by a least squares analysis method, summing the AEI and CHA contribution of each intergrown phases. For Synchrotron XRDs, the comparison with the DIFFaX simulated patterns was done by converting the experimental XRD patterns to CuKα1 (λ=1.54056 A).

In addition, the $^{13}C$ MAS (magic-angle spinning) NMR spectra were obtained using a Chemagnetics® CMXII-200 spectrometer operating at a static field of 4.7 T (199.9 MHz $^{1}H$, 50.3 MHz $^{13}C$). The as-synthesized samples were loaded in MAS $ZrO_2$ NMR rotors (5-mm o.d.) and spun at the magic angle. The $^{13}C$ MAS NMR (or Bloch decay) experiments were performed using a doubly-tuned probe by applying a (90°) $^{13}C$ pulse followed by $^{13}C$ data acquisition. A $^{1}H$-$^{13}C$ dipolar-decoupling field of about 62-kHz was used during $^{13}C$ data acquisition. The $^{13}C$ Bloch decay spectra were obtained at 8-kHz MAS using a pulse delay of about 60-sec. The free-induction decays thus obtained were Fourier transformed (with a 25 Hz exponential line broadening filter). The $^{13}C$ chemical shifts are referenced with respect to an external solution of tetramethyl silane (TMS $\delta_C$=0.0 ppm), using hexamethyl benzene as a secondary standard. One or more of the none-overlapping regions can be taken and its relative intensity determined. This can in turn be converted into mole ratio of the specific template whereby the relative contribution of one template versus the other can be calculated. All solid-state NMR measurements were done at room temperature.

TEM analysis included both Bright-Field TEM imaging (BF-TEM) and High-Resolution TEM imaging (HR-TEM).

TEM data were obtained by crushing individual as-calcined samples into fines (<100 nm thick) using an agate mortar and pestle. The fines were transferred into a flat bed mold, embedded in a standard mix of LR White hard grade resin (Polysciences, Inc., USA), and cured under ambient conditions. The resin blocks were removed from the flat bed molds and placed "end on" into polyethylene BEEM capsules. Each BEEM capsule was filled with a standard mix of LR White hard grade embedding resin and cured under ambient conditions. The cured resin blocks were removed from the BEEM capsules and placed into a Reichert-Jung Ultracut E microtome. Electron transparent sections (~100 nm thick) were ultramicrotomed at ambient temperature from the resin blocks using a diamond knife. The microtomy process fractured the samples into many small sections, which were floated off on water and collected onto standard, 200 mesh carbon-coated TEM grids. After air-drying, the grids were examined in the bright field TEM imaging mode of a Philips CM200F TEM/STEM at an accelerating voltage of 200 kV. Each small section of material was identified as a chard in the TEM analysis. In order to quantify the number of faulted crystals, 500 chards of each sample were examined at low magnification, and the presence of stacking faults or twins was noted by visual inspection. The number of faulted crystals is expressed as the number of chards that show one or more faults or twins in a total of 500 chards.

HR-TEM data were obtained by embedding the calcined samplez in LR White hard grade resin (The London Resin Co., UK). Then, without adding the curing accelerator; the resin was thermally cured at 80° C. for at least 3 hours in a nitrogen atmosphere. Electron transparent thin sections were cut at ambient temperature using a Boeckeler Powertome XL ultra-microtome equipped with a diamond knife. The thin sections were collected on lacey carbon TEM grids. HR-TEM analysis was done in a Philips CM12T transmission electron microscope at an accelerating voltage of 120 kV. The crystals were carefully oriented with the appropriate zone axis parallel to the electron beam and high-resolution TEM images were recorded on photographic plate at a nominal magnification of 100,000×.

EXAMPLE 1

0.286 ml of a 23.5 mg/ml aqueous solution of $Al(NO_3)_3 \cdot 9H_2O$ was added to a mixture of 8.060 ml of an aqueous solution of N,N-diethyl-2,6-dimethylpiperidinium hydroxide, $DEDMP^+$ $OH^-$, (0.6008 molar) and 1.000 ml of an aqueous solution of N,N,N-tri-methyl-1-adamantylammonium hydroxide, $TMAA^+$ $OH^-$, (0.5379 molar). 2.400 ml of tetraethylorthosilicate was then added to this composition and the resultant mixture was continuously stirred in a sealed container for at least 2–3 hours at room temperature until all the tetraethylorthosilicate was completely hydrolyzed. To the resultant clear solution was added 0.234 ml of a 48 wt % aqueous solution of hydrofluoric acid which immediately resulted in the production of a slurry. This slurry was further homogenized by stirring and exposure to air for evaporation of water and ethanol until a thick slurry mixture was obtained. Extra water was further evaporated from the slurry mixture under static conditions to give 2672 mg of a dry gel solid having the following molar composition:

$SiO_2:0.00083Al_2O_3:0.45DEDMP:0.05TMAA:0.6F:5.0H_2O$

To this solid was added with mechanical mixing 10 mg (0.37 wt % based on the dry gel solid) of a seeding material, AEI having a Si/Al atomic ratio of 8.9 and Si/Na atomic ratio of 26.4. The resulting mixture of solids was transferred to a Teflon®-lined 5 ml pressure reactor and crystallized at 150° C. for 65 hours under slow rotation (about 60 rpm). After cooling, the resultant solid was recovered by centrifuging, washed with distilled water, and dried at 100° C. to give 775 mg of a white microcrystalline solid (29.0% yield based on the weight of the dry gel). The as-synthesized product had the X-ray diffraction pattern summarized in Table 2 below. The calcined product had the Scintag X-ray diffraction pattern shown in FIG. 2.

Figure 2:
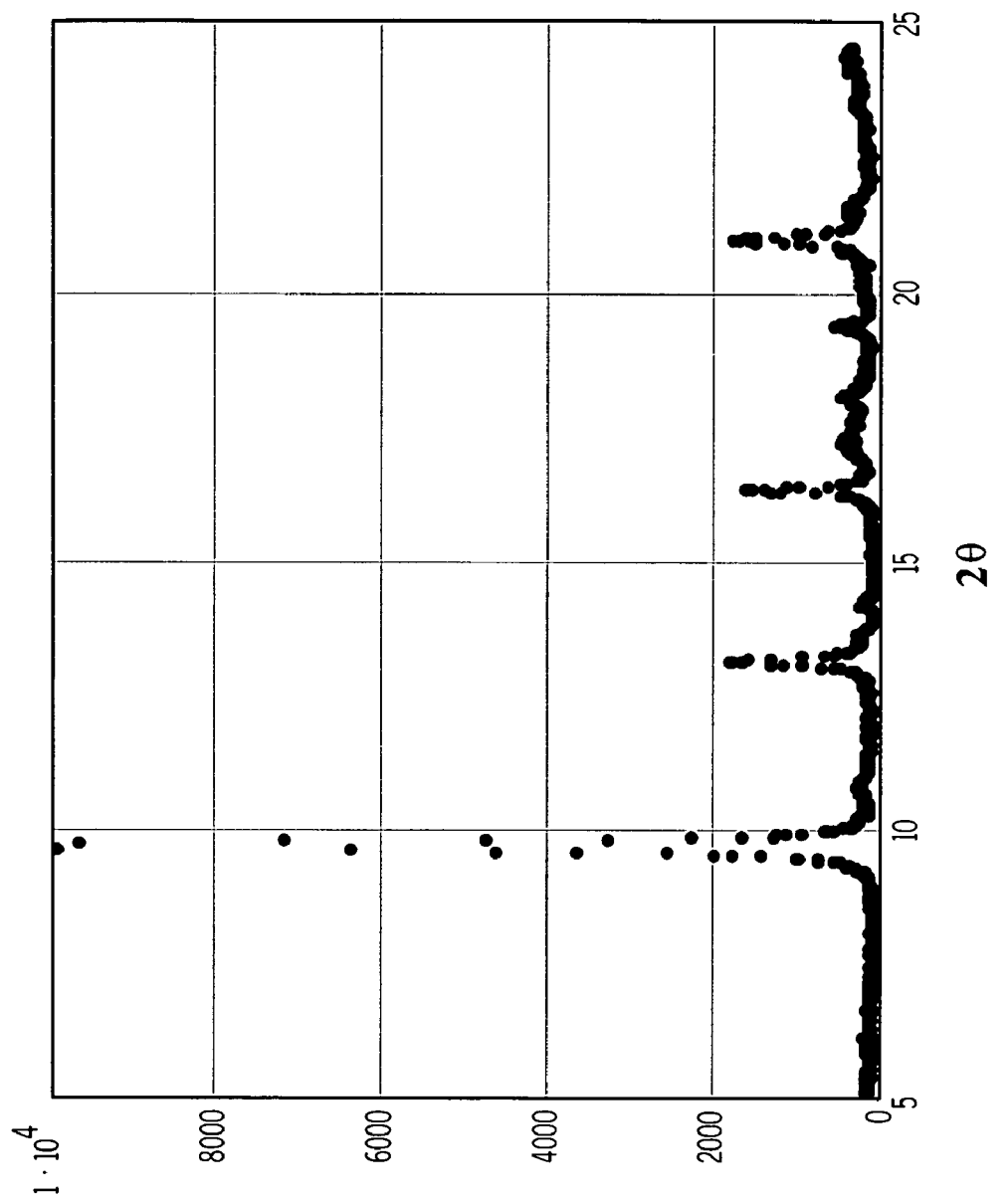
FIG. 2 is the X-ray diffraction pattern of the calcined product of Example 1.
Figure 3:
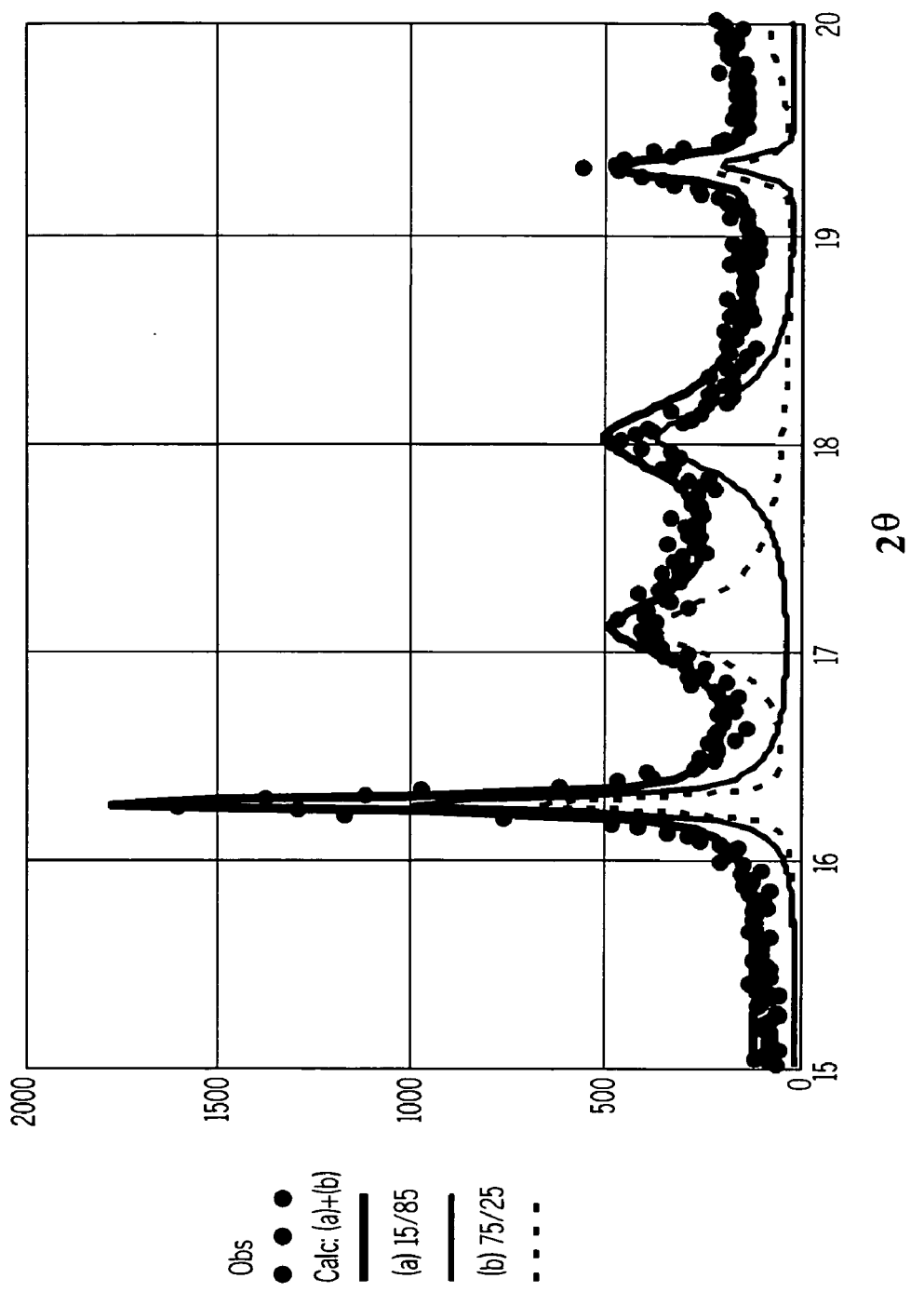
FIG. 3 is an overlay of part of the X-ray diffraction pattern of FIG. 2 with the DIFFaX simulated trace obtained as the sum of 56% of phase (a), a random intergrown AEI/CHA phase having an AEI/CHA ratio of 15/85, and 44% of phase (b), a random intergrown AEI/CHA phase having an AEI/CHA ratio of 75/25. The weighted average AEI/CHA ratio for example 1 is calculated as 41/59.

DIFFaX analysis was conducted on the X-ray pattern of FIG. 2 and the results are summarized in FIG. 3. FIG. 3 shows that the product of Example 1 is characterized by the presence of more than one random intergrown AEI/CHA phase. Least squares analysis shows that the product of Example 1 is composed of about 56 wt % of a first intergrown AEI/CHA phase having an AEI/CHA ratio of 15/85 and about 44 wt % of a second intergrown AEI/CHA phase having an AEI/CHA ratio of 75/25, such that the weighted average AEI/CHA ratio of the material was about 41/59.

SEM analysis of the calcined product showed particles having a thick plate morphology and a size of about 1–2 micron. Chemical analysis showed the silica/alumina molar ratio of the product to be 1200.

TABLE 2

X-Ray Diffraction Pattern of As-Synthesized Product of Example 1

| 2 Theta | d(Å) | 100 I/Io |
|---|---|---|
| 9.75 | 9.069 | 100.0 |
| 13.20 | 6.703 | 6.1 |
| 14.28 | 6.197 | 15.0 |
| 16.38 | 5.406 | 96.5 |
| 17.27 | 5.129 | 8.4 |
| 18.11 | 4.896 | 10.6 |
| 19.40 | 4.572 | 3.4 |
| 21.04 | 4.220 | 89.0 |
| 21.63 | 4.106 | 6.4 |
| 22.44 | 3.959 | 7.9 |
| 22.86 | 3.887 | 3.7 |
| 23.54 | 3.776 | 3.0 |
| 24.36 | 3.651 | 5.0 |
| 25.39 | 3.505 | 17.6 |
| 26.44 | 3.369 | 20.6 |
| 28.21 | 3.160 | 5.1 |
| 30.12 | 2.965 | 6.1 |
| 31.25 | 2.860 | 28.5 |
| 31.63 | 2.827 | 18.8 |
| 32.95 | 2.716 | 4.2 |
| 35.20 | 2.547 | 2.8 |
| 36.63 | 2.451 | 3.6 |
| 40.46 | 2.228 | 2.0 |
| 43.66 | 2.071 | 3.0 |
| 44.22 | 2.047 | 3.2 |

EXAMPLE 2

The synthesis of Example 1 was repeated in two separate experiments using the same starting materials in the same proportions as Example 1 but with the crystallization temperatures being 135° C. and 175° C. respectively. DIFFaX analysis was conducted as described in example 1 on the Synchrotron X-ray diffraction pattern of the calcined product of the 175° C. synthesis and showed the presence of two intergrown AEI/CHA phases, namely about 78 wt % of a first intergrown phase having an AEI/CHA ratio of 5/95 and and about 22 wt % of a second intergrown phase having an AEI/CHA ratio of 95/5, which corresponds to a weighted average AEI/CHA ratio of about 25/75.

$^{13}C$ MAS NMR analysis of the product of the 175° C. synthesis showed the presence of DEDMP (the AEI directing agent) and TMAA (the CHA directing agent) in a molar ratio of 50/50 in the as-synthesized product. This contrasts with a DEDMP:TMAA molar ratio of 90/10 in the synthesis mixture.

Figure 4:
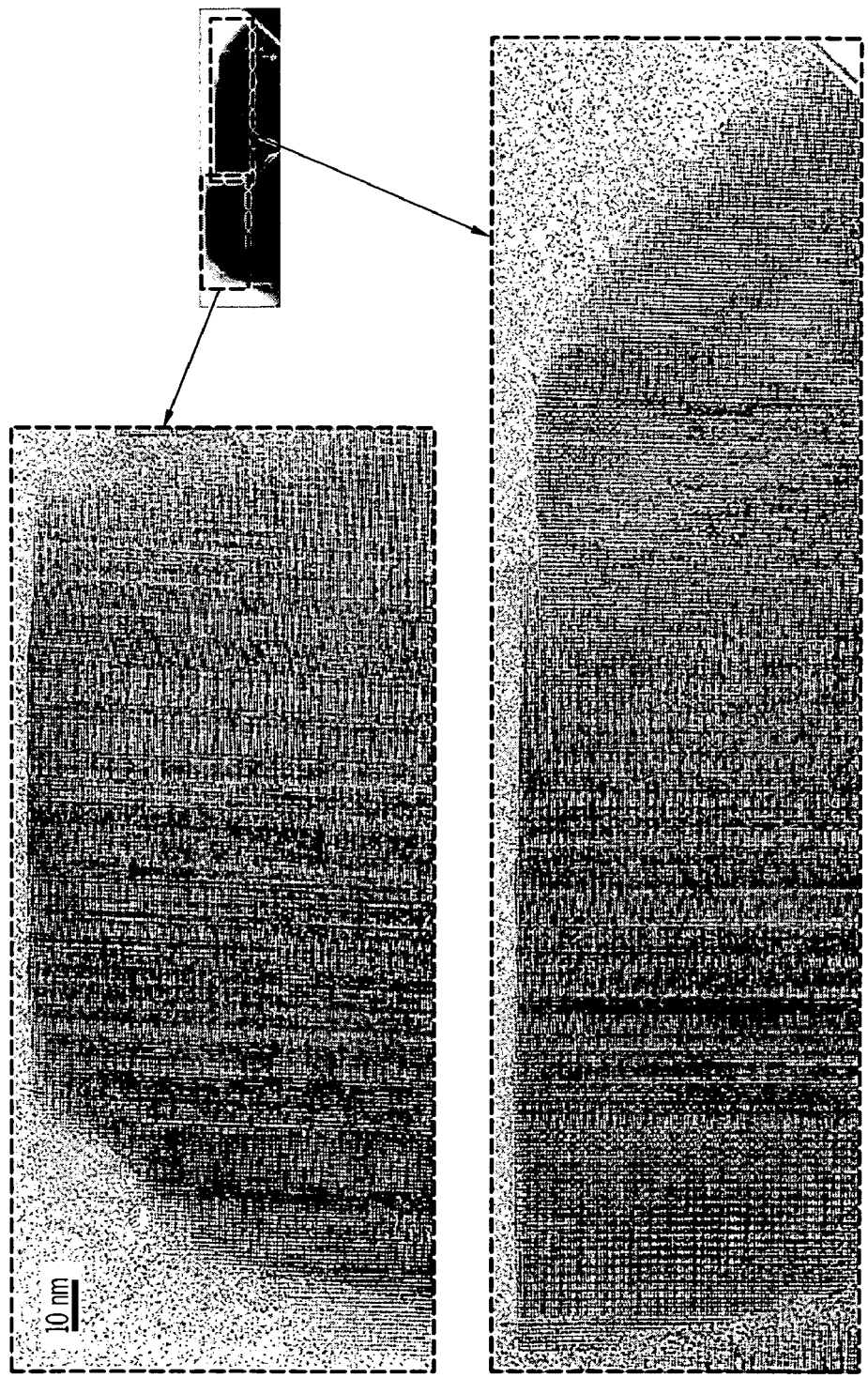
FIG. 4 is a high resolution transmission electron micrograph of the product of the 175° C. synthesis of Example 2.

A high resolution transmission electron micrograph of the product of the 175° C. synthesis is shown in FIG. 4 and confirms the presence of twinned/faulted CHA crystals with intercalated regions of faulted AEI phase material.

EXAMPLE 3

Figure 5:
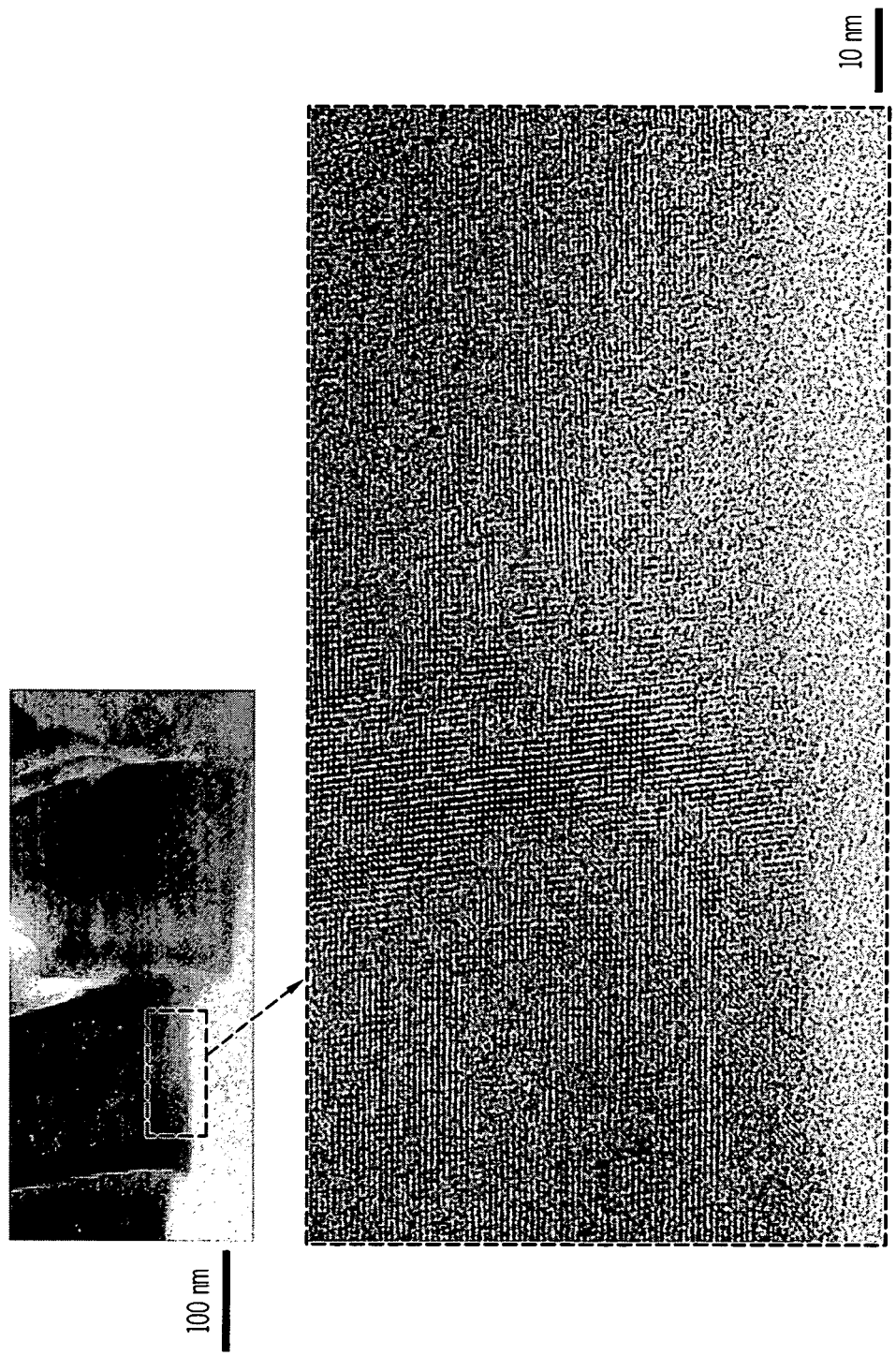
FIG. 5 is a high resolution transmission electron micrograph of the product of Example 3. The inset is a Fourier Transform of the high resolution transmission electron micrograph.

The synthesis of Example 1 was repeated with the molar ratio of DEDMP/TMAA in the synthesis mixture being 1.0. DIFFaX analysis on the Synchrotron X-ray diffraction pattern of the as-calcined product showed the product to be pure CHA. In addition, $^{13}C$ MAS NMR analysis showed the presence of only TMAA (the CHA directing agent) in the as-synthesized product. A HR-TEM transmission electron micrograph of the product is shown in FIG. 5. No presence of faulting is apparent in the HR-TEM image. The Fourier Transform of the HR-TEM image shows sharp spots and no streaks, which is indicative of a regular stacking and of the absence of stacking faults or twins. No faults were observed in the 500 chards produced for the TEM analysis.

EXAMPLE 4

The synthesis of Example 1 was repeated with the molar ratio of DEDMP/TMAA in the synthesis mixture being 5.67 and the crystallization temperature being 175° C. DIFFaX analysis on the Synchrotron X-ray diffraction pattern of the as-calcined product showed the presence of three phases, namely about 73.5 wt % of a first intergrown phase having an AEI/CHA ratio of 5/95, about 5.2 wt % of a second intergrown phase having an AEI/CHA ratio of 90/10 and about 21.3 wt % of a third phase having an AEI/CHA ratio of 0/100, which corresponds to a weighted average AEI/CHA ratio of about 8.5/91.5. $^{13}C$ MAS NMR analysis showed the presence of DEDMP (the AEI directing agent)

and TMAA (the CHA directing agent) in a molar ratio of 23/77 in the as-synthesized product.

EXAMPLE 5 (COMPARATIVE)

The process described in U.S. Pat. No. 4,544,538 was repeated to produce SSZ-13 as follows. 2.00 g 1N NaOH, 2.78 g 0.72 molar N,N,N-trimethyladamantammonium hydroxide, and 3.22 g deionized water were added sequentially to a 23 ml Teflon lined Parr autoclave. To the resultant solution 0.05 g of aluminum hydroxide (Teheis F-2000 dried gel, 50% $Al_2O_3$) was added and the solution was mixed until it cleared. 0.60 g fumed silica (Cab-O-Sil, M5 grade, 97% $SiO_2$) was then added to the autoclave and the solution was mixed until uniform.

The autoclave was sealed and heated without agitation at 160° C. for 4 days. The autoclave was then cooled to room temperature and the solid product recovered by filtration. The product was washed repeatedly with deionized water and then dried in a vacuum oven at 50° C.

Figure 6:
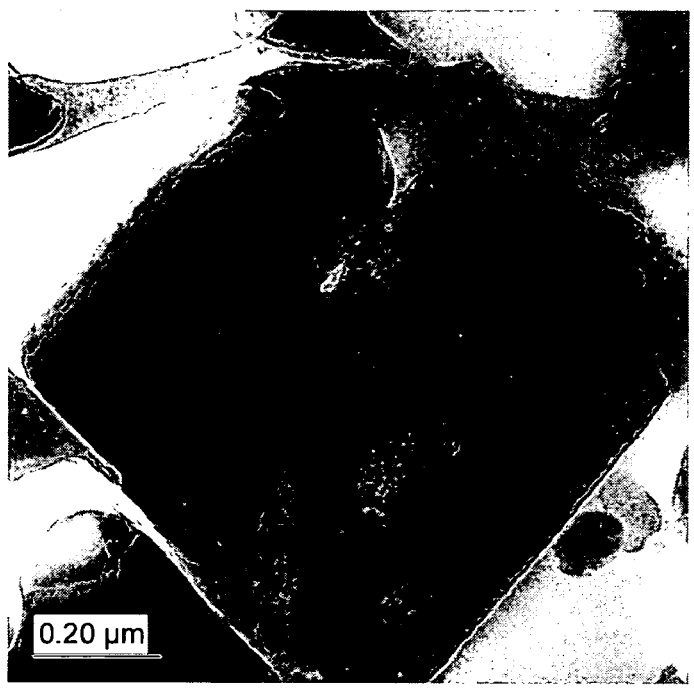
FIG. 6 is a bright-field transmission electron micrograph of the product of Comparative Example 5.

X-ray diffraction analysis showed the product to be pure CHA framework type molecular sieve. A transmission electron micrograph of the product is shown in FIG. 6. No presence of faulting is apparent in the TEM and no faults were observed in the 500 chards produced for the TEM analysis.

EXAMPLE 6 (COMPARATIVE)

Figure 7:
FIG. 7 is a bright-field transmission electron micrograph of the natural chabazite of Comparative Example 6.

A sample of a light brown colored natural chabazite was obtained from western US. It was analyzed to have Si/Al=3.70, 0.28 wt % Na, 0.33 wt % K, 0.03 wt % Ca, 0.28 wt % Mg, and 1.50 wt % Fe. The sample was subjected to transmission electron microscopy without any prior treatment and the results are shown in FIG. 7. No presence of faulting was apparent in the BF-TEM and no faults were observed in the 500 chards produced for the BF-TEM analysis.

EXAMPLE 7

0.239 ml of a 23.5 mg/ml aqueous solution of $Al(NO_3)_3 \cdot 9H_2O$ was added to a mixture of 5.597 ml of an aqueous solution of N,N-diethyl-2,6-dimethylpiperidinium hydroxide, $DEDMP^+ OH^-$, (0.6008 molar) and 1.959 ml of an aqueous solution of N,N,N-tri-methyl-1-adamantylammonium hydroxide, $TMAA^+ OH^-$, (0.5721 molar). 2.000 ml of tetraethylorthosilicate was then added to this composition and the resultant mixture was continuously stirred in a sealed container for 15 hours at room temperature until all the tetraethylorthosilicate was completely hydrolyzed. To the resultant clear solution was added 0.195 ml of a 48 wt % aqueous solution of hydrofluoric acid which immediately resulted in the production of a slurry. This slurry was further homogenized by stirring and exposure to air for evaporation of water and ethanol until a thick slurry mixture was obtained. To this thick slurry, 0.058 ml (0.37 wt. % based on the weight of the dry gel) of LEV colloidal seeds ($SiO_2$/$Al_2O_3$=12) suspension slurry (14.1 wt. %) containing 4478 wt. ppm of sodium and 18000 wt. ppm of potassium was added and stirring was continued for another 10 minutes. Extra water was further evaporated from the slurry mixture under static conditions to give 2242 mg of a dry gel solid having the following molar composition:

$SiO_2:0.00083Al_2O_3:0.375DEDMP:0.125TMAA:0.6F:5.0H_2O$

The resulting mixture of solids was transferred to a Teflon®-lined 5 ml reactor and crystallized at 175° C. for 65 hours under slow rotation (about 60 rpm). After cooling, the resultant solid was recovered by centrifuging, washed with distilled water, and dried at 100° C. to give 634 mg of a white microcrystalline solid (28.3% yield based on the weight of the dry gel). The Synchrotron X-ray diffraction pattern of as-synthesized product is shown in Table 3, whereas the X-ray diffraction pattern of the as-calcined product is shown in FIG. 8.

Figure 8:
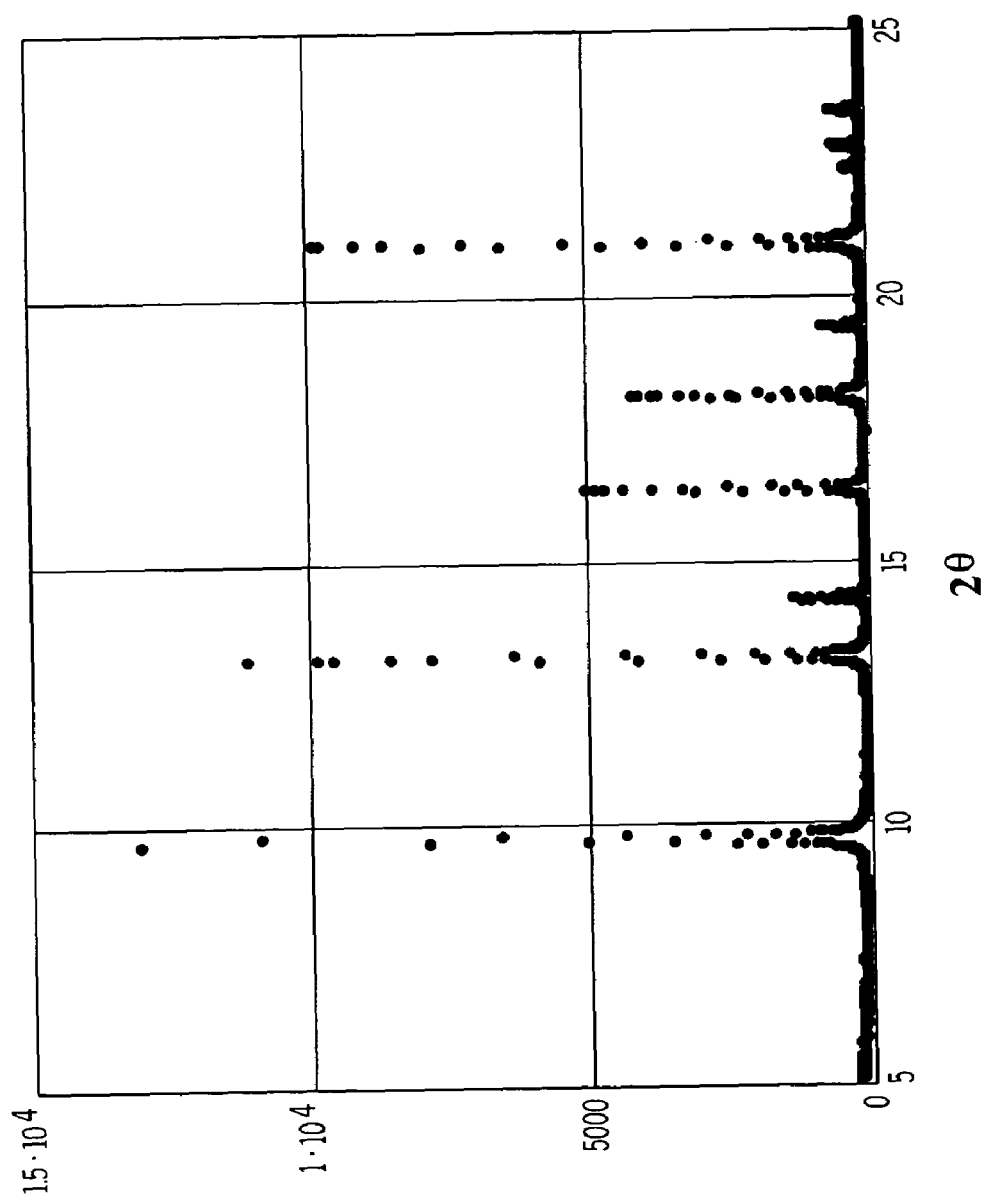
FIG. 8 is the X-ray diffraction pattern of the calcined product of Example 7.
Figure 9:
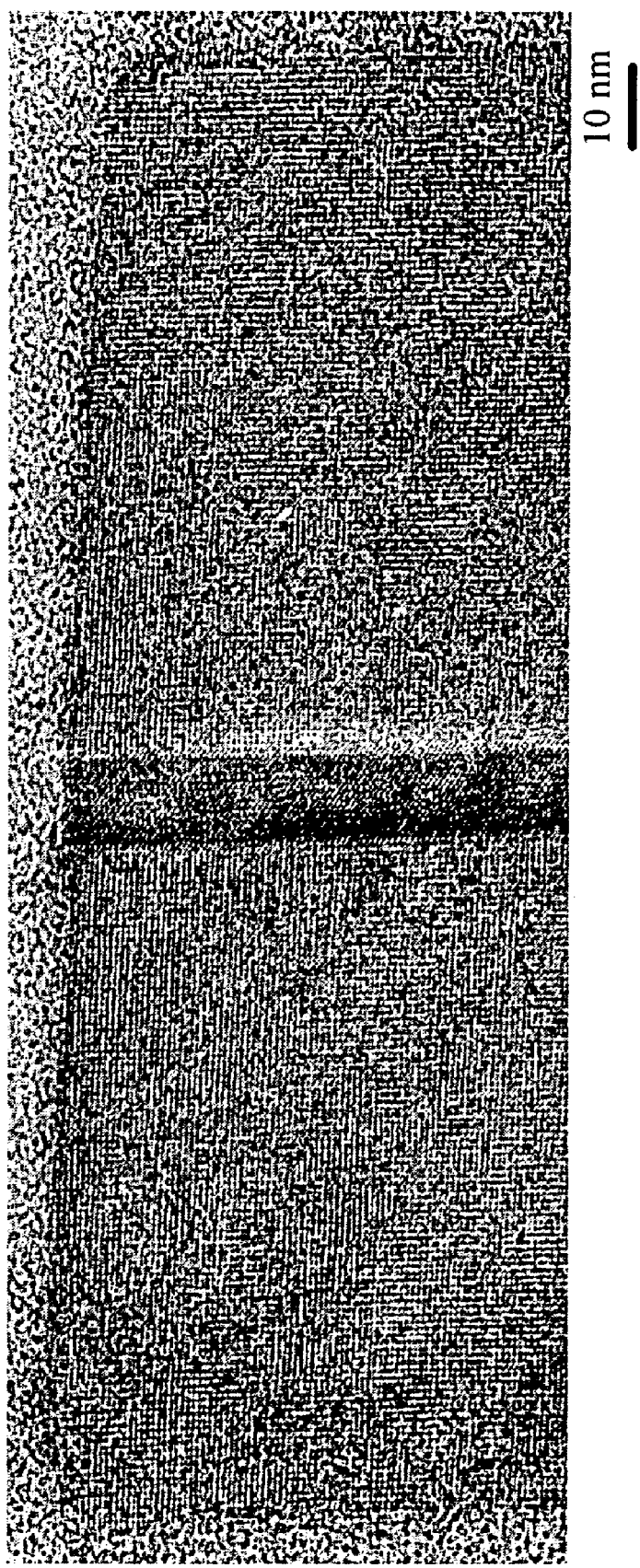
FIG. 9 is a high resolution transmission electron micrograph of the product of Example 7.

DIFFaX analysis on the calcined Synchrotron X-ray pattern of FIG. 8 suggests the material of Example 7 is a pure CHA phase material. However, $^{13}C$ MAS NMR analysis showed the presence of DEDMP (the AEI directing agent) and TMAA (the CHA directing agent) in a molar ratio of 13/87 in the as-synthesized product. The HR-TEM of the product is shown in FIG. 9 and clearly shows the crystal is faulted. To quantify the amount of faulting, 500 chards were analyzed in BF-TEM and 10% of the chards showed faults.

$^{13}C$ MAS NMR analysis showed the presence of DEDMP (the AEI directing agent) and TMAA (the CHA directing agent) in a molar ratio of 13/87 in the as-synthesized product. SEM analysis of the calcined product showed particles having a thick plate morphology and a size of about 0.5 micron. Chemical analysis showed the silica/alumina molar ratio of the product to be 1200.

TABLE 3

X-Ray Diffraction Pattern of As-Synthesized Product of Example 7

| 2 Theta | d(Å)  | 100 I/Io |
|---------|-------|----------|
| 9.50    | 9.300 | 30.8     |
| 12.96   | 6.825 | 2.7      |
| 14.03   | 6.308 | 14.7     |
| 16.15   | 5.484 | 64.9     |
| 17.85   | 4.965 | 14.8     |
| 19.20   | 4.620 | 1.9      |
| 20.82   | 4.263 | 100.0    |
| 22.18   | 4.005 | 10.3     |
| 22.66   | 3.922 | 8.6      |
| 23.30   | 3.815 | 3.2      |
| 25.12   | 3.542 | 33.3     |
| 26.24   | 3.393 | 24.0     |
| 28.01   | 3.183 | 4.5      |
| 28.42   | 3.138 | 3.2      |
| 29.93   | 2.983 | 4.0      |
| 31.03   | 2.880 | 50.1     |
| 31.40   | 2.847 | 17.8     |
| 31.97   | 2.797 | 1.3      |
| 32.78   | 2.730 | 2.8      |
| 33.81   | 2.649 | 2.2      |
| 35.00   | 2.561 | 4.6      |
| 35.44   | 2.531 | 1.7      |
| 36.41   | 2.465 | 5.5      |
| 38.82   | 2.318 | 1.0      |
| 39.12   | 2.301 | 1.6      |
| 40.29   | 2.237 | 4.5      |
| 42.53   | 2.124 | 0.8      |
| 43.31   | 2.087 | 4.2      |
| 44.08   | 2.053 | 6.6      |
| 45.75   | 1.981 | 0.4      |
| 47.55   | 1.911 | 1.6      |
| 48.45   | 1.877 | 4.5      |
| 49.55   | 1.838 | 5.9      |

EXAMPLE 8

The as-synthesized materials from Examples 1 and 2 were individually pressed to pellets at 30000 psig ($2.07 \times 10^5$ kPa) and then ground and sieved to between 80 and 125 μm. Two separate samples of each of the sized materials were weighed between 21 and 22 mg and mixed separately with 90 mg of 100 μm silicon carbide. These mixtures were loaded into separate 1.9 mm internal diameter tubes sealed at the bottom with a quartz frit. The tubes were sealed into heated reactor blocks and the catalysts were then calcined at 540° C. under flowing air for 2 hours to effect organic template removal. The calcined catalysts were then subjected to a mixture of 85% methanol in $N_2$ at 500° C., approximately 100 weight hourly space velocity (WHSV), and 40 psia (276 kPa) methanol partial pressure for 25 minutes. During the methanol reactions the reactor effluents were collected and stored at timed intervals for analysis by gas chromatography. Following the methanol reaction the catalysts were subjected to a flow of 50% oxygen in nitrogen at 550° C. for approximately 90 minutes to burn off deposited coke. The reactor effluents were analyzed by infrared spectroscopy with quantitation of both carbon monoxide and carbon dioxide to determine the amounts of coke deposition.

Selectivities to hydrocarbon products were calculated. The values given below are averages of each individual selectivity over the entire reaction. Each value represents an average of the selectivities obtained from the two individual repeats.

| Selectivity | Crystallization Temperature (° C.) | | |
|---|---|---|---|
| | 135 | 150 | 175 |
| $C_1$ | 1.4 | 1.1 | 1.0 |
| $C_2^0$ | 0.1 | 0.1 | 0.1 |
| $C_2^-$ | 28.2 | 27.9 | 28.7 |
| $C_3^0$ | 1.4 | 0.1 | 0.1 |
| $C_3^-$ | 46.3 | 46.2 | 46.0 |
| $C_4$ | 18.5 | 18.9 | 18.7 |
| $C_5^+$ | 5.4 | 5.1 | 4.8 |
| Coke | 0.5 | 0.4 | 0.4 |

EXAMPLE 9

The synthesis of Example 3 was repeated with the molar ratio of DEDMP/TMAA in the synthesis mixture varying between 0.33 and 19. The results of $^{13}C$ MAS NMR analysis for detecting the presence of DEDMP (the AEI directing agent) and TMAA (the CHA directing agent), expressed in molar ratios, in the as-synthesized products, as well as the percentage of faulted chards observed in 500 chards by BF-TEM analysis are shown in the following table, together with the results for the as-synthesized material from Example 3.

| DEDMP/TMAA in synthesis gel | 1 | 3 | 5.67 |
|---|---|---|---|
| 13 C NMR analysis DEDMP/TMAA in as-synthesized crystals | 0/100 | 8/92 | 30/70 |
| Faulted Chards by TEM (% in 500 chards) | 0 | 3 | 27 |

The as-synthesized products of Example 9, together with the as-synthesized material from Example 3, were individually pressed to pellets at 30000 psig ($2.07 \times 10^5$ kPa) and then ground and sieved to between 80 and 125 μm. Two separate samples of both of the sized materials were weighed between 21 and 22 mg and mixed separately with 90 mg of 100 μm silicon carbide. These mixtures were loaded into separate 1.9 mm internal diameter tubes sealed at the bottom with a quartz frit. The tubes were sealed into heated reactor blocks and the catalysts were then calcined at 540° C. under flowing air for 2 hours to effect organic template removal. The calcined catalysts were then subjected to a mixture of 85% methanol in $N_2$ at 540° C., approximately 100 weight hourly space velocity (WHSV), and 40 psia (276 kPa) methanol partial pressure. During the methanol reactions the reactor effluents were collected and stored at timed intervals for analysis by gas chromatography. Following the methanol reaction the catalysts were subjected to a flow of 50% oxygen in nitrogen at 550° C. for approximately 90 minutes to burn off deposited coke. The reactor effluents were analyzed by infrared spectroscopy with quantitation of both carbon monoxide and carbon dioxide to determine the amounts of coke deposition.

Selectivities to hydrocarbon products were calculated for each reaction. The values given below are the individual point selectivities obtained 30 seconds after the start of the methanol reaction for each catalyst. These values represent the points of maximum olefin selectivity for each catalyst. Each value represents an average of the selectivities obtained from the two individual repeats.

| Selectivity | DEDMP/TMAA Ratio in Synthesis Gel | | | | | |
|---|---|---|---|---|---|---|
| | 0.33 | 1 | 3 | 5.67 | 9 | 19 |
| $C_1$ | 2.5 | 2.4 | 2.2 | 2.4 | 2.1 | 1.2 |
| $C_2^0$ | 0.4 | 0.4 | 0.3 | 0.3 | 0.3 | 0.3 |
| $C_2^-$ | 42.0 | 42.5 | 43.5 | 41.2 | 38.8 | 33.8 |
| $C_3^0$ | 0.3 | 0.3 | 0.2 | 0.1 | 0.1 | 0.3 |
| $C_3^-$ | 35.3 | 35.2 | 35.1 | 36.9 | 39.3 | 43.1 |
| $C_4$ | 13.7 | 13.5 | 13.4 | 14.1 | 14.7 | 16.1 |
| $C_5^+$ | 4.6 | 4.6 | 4.2 | 4.4 | 4.2 | 4.7 |
| Coke | 1.2 | 1.3 | 1.0 | 0.6 | 0.5 | 0.5 |

EXAMPLE 10

The as-synthesized material from Example 7 was pressed to a pellet at 30000 psig ($2.07 \times 10^5$ kPa) and then ground and sieved to between 80 and 125 μm. Two separate samples of the sized material were weighed between 21 and 22 mg and mixed separately with 90 mg of 100 μm silicon carbide. These mixtures were loaded into separate 1.9 mm internal diameter tubes sealed at the bottom with a quartz frit. The tubes were sealed into heated reactor blocks and the catalysts were then calcined at 540° C. under flowing air for 2 hours to effect organic template removal. The calcined catalysts were then subjected to a mixture of 85% methanol in $N_2$ at 540° C., approximately 100 weight hourly space velocity (WHSV), and 40 psia (276 kPa) methanol partial pressure for 25 minutes. During the methanol reaction the reactor effluents were collected and stored at timed intervals for analysis by gas chromatography. Following the methanol reaction the catalysts were subjected to a flow of 50% oxygen in nitrogen at 550° C. for approximately 90 minutes to burn off deposited coke. The reactor effluents were analyzed by infrared spectroscopy with quantitation of both carbon monoxide and carbon dioxide to determine the amounts of coke deposition.

Selectivities to hydrocarbon products were calculated. The values given below are averages of each individual selectivity over the entire reaction. Each value represents an average of the selectivities obtained from the two individual repeats.

| Product | Selectivity |
|---------|-------------|
| $C_1$ | 2.9 |
| $C_2^0$ | 0.3 |
| $C_2^=$ | 41.6 |
| $C_3^0$ | 0.1 |
| $C_3^=$ | 36.0 |
| $C_4$ | 13.7 |
| $C_5^+$ | 3.9 |
| Coke | 1.3 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

We claim:

1. A crystalline material substantially free of framework phosphorus and comprising a CHA framework type molecular sieve with stacking faults or at least one intergrown phase of a CHA framework type molecular sieve and an AEI framework type molecular sieve, wherein said material, in its calcined, anhydrous form, has a composition involving the molar relationship:

$$(n)X_2O_3:YO_2,$$

wherein X is a trivalent element; Y is a tetravalent element; and n is from 0 to about 0.5.

2. The crystalline material of claim 1 wherein n is from about 0.001 to about 0.1.

3. The crystalline material of claim 1 wherein n is from about 0.0017 to about 0.02.

4. The crystalline material of claim 1 wherein said material, in its calcined form, contains from about 1 to about 100 ppm by weight of a halide.

5. The crystalline material of claim 1 wherein said material, in its calcined form, contains from about 5 to about 50 ppm by weight of a halide.

6. The crystalline material of claim 1 wherein said material, in its calcined form, contains from about 10 to about 20 ppm, by weight of a halide.

7. The crystalline material of claim 4 wherein said halide comprises fluoride.

8. The crystalline material of claim 1 wherein Y is silicon, tin, titanium germanium or a combination thereof.

9. The crystalline material of claim 1 wherein Y is silicon.

10. The crystalline material of claim 1 wherein X is aluminum, boron, iron, indium, gallium or a combination thereof.

11. The crystalline material of claim 1 wherein X is aluminum.

12. A crystalline material which comprises at least a CHA framework type molecular sieve and which, in its as-synthesized form, contains in its intra-molecular framework a first directing agent for directing the synthesis of a CHA framework-type molecular sieve and a second directing agent for directing the synthesis of a AEI framework-type molecular sieve, said first and second directing agents being different and the first directing agent comprising a multicyclic amine or ammonium compound.

13. The crystalline material of claim 12, wherein the first directing agent comprises a tricyclic or tetracyclic amine or ammonium compound.

14. The crystalline material of claim 12, wherein the first directing agent comprises at least one of an N-alkyl-3-quinuclidinol, an N,N,N-trialkyl-exoaminonorbornane, an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound and N,N-dimethylcyclohexylamine.

15. The crystalline material of claim 12, wherein the first directing agent comprises an N,N,N-trimethyl-1-adamantylammonium compound.

16. The crystalline material of claim 12, wherein the second directing agent comprises a monocyclic amine or ammonium compound.

17. The crystalline material of claim 12, wherein the second directing agent comprises a substituted piperidine or piperidinium compound.

18. The crystalline material of claim 12, wherein the second directing agent comprises a tetraalkylpiperidinium compound.

19. The crystalline material of claim 12, wherein the second directing agent comprises an N,N-dimethyl-2,6-dimethylpiperidinium compound or an N,N-diethyl-2,6-dimethylpiperidinium compound.

20. The crystalline material of claim 12, wherein the molar amount of second directing agent retained in the as-synthesized material to the total molar amount of first and second directing agents retained in the as-synthesized material is between 0.1 and 0.3.

21. The crystalline material of claim 12 wherein said material is substantially free of framework phosphorus.

22. A method of synthesizing a crystalline material comprising a CHA framework type molecular sieve and having a composition involving the molar relationship:

$$(n)X_2O_3:YO_2,$$

wherein X is a trivalent element; Y is a tetravalent element; and n is from 0 to about 0.5, the method comprising:
(a) preparing a reaction mixture capable of forming said material, said mixture comprising a source of water, a source of an oxide of a tetravalent element Y and optionally a source of an oxide of a trivalent element X;
(b) maintaining said reaction mixture under conditions sufficient to form crystals of said crystalline material comprising stacking faults or at least one intergrown phase of a CHA framework type molecular sieve and an AEI framework type molecular sieve; and
(c) recovering said crystalline material from (b).

23. The method of claim 22 wherein said reaction mixture also comprises at least one organic directing agent (R) for directing the formation of said crystalline material.

24. The method of claim 22 wherein said reaction mixture also comprises a plurality of different organic directing agents for directing the formation of said crystalline material.

25. The method of claim 22 wherein said reaction mixture comprises at least one first organic directing agent for directing the formation of a CHA framework type material and at least one second organic directing agent for directing the formation of an AEI framework type material.

26. The method of claim 25, wherein the first directing agent comprises a multi-cyclic amine or ammonium compound.

27. The method of claim 25, wherein the first directing agent comprises a tricyclic or tetracyclic amine or ammonium compound.

28. The method of claim 25, wherein the first directing agent comprises at least one of an N-alkyl-3-quinuclidinol, an N,N,N-trialkyl-exoaminonorbornane, an N,N,N-trimethyl-1-adamantammonium compound, an N,N,N-trimethyl-2-adamantammonium compound, an N,N,N-trimethylcyclohexylammonium compound, an N,N-dimethyl-3,3-dimethylpiperidinium compound, an N,N-methylethyl-3,3-dimethylpiperidinium compound, an N,N-dimethyl-2-methylpiperidinium compound, a 1,3,3,6,6-pentamethyl-6-azonio-bicyclo(3.2.1)octane compound and N,N-dimethylcyclohexylamine.

29. The method of claim 25, wherein the first directing agent comprises an N,N,N-trimethyl-1-adamantylammonium compound.

30. The method of claim 25, wherein the second directing agent comprises a monocyclic amine or ammonium compound.

31. The method of claim 25, wherein the second directing agent comprises a substituted piperidine or piperidinium compound.

32. The method of claim 25, wherein the second directing agent comprises a tetraalkylpiperidinium compound.

33. The method of claim 25, wherein the second directing agent comprises an N,N-dimethyl-2,6-dimethylpiperidinium compound or an N,N-diethyl-2,6-dimethylpiperidinium compound.

34. The method of claim 25, wherein the molar ratio of the first organic directing agent to the second organic directing agent in the reaction mixture is between about 0.01 and about 100.

35. The method of claim 22, wherein said reaction mixture also comprises a halide or a halide-containing compound.

36. The method of claim 22, wherein said reaction mixture also comprises a fluoride or fluoride-containing compound.

37. The method of claim 22, wherein the conditions in (b) include a temperature of from about 50° C. to about 300° C.

38. The method of claim 22, wherein the conditions in (b) include a temperature of from about 135° C. to about 185° C.

39. The method of claim 22, wherein said reaction mixture also comprises seed crystals.

40. The method of claim 39, wherein said seed crystals are added to said reaction mixture as a colloidal suspension in a liquid medium.

41. The method of claim 39, wherein said seed crystals are homostructural with said crystalline material comprising at least one intergrown phase of a CHA framework type and an AEI framework type.

42. The method of claim 39, wherein said seed crystals comprise a crystalline material having an AEI, OFF, CHA or LEV framework-type.

43. The method of claim 39, wherein said seed crystals comprise a crystalline material having an AEI framework type.

44. The method of claim 23, wherein said reaction mixture has the following molar composition:

| | |
|---|---|
| $H_2O/YO_2$ | 0.1 to 20 |
| Halide/$YO_2$ | 0 to 2 |
| R/$YO_2$ | 0.01 to 2; |
| $X_2O_3/YO_2$ | 0 to 0.5. |

45. The method of claim 23, wherein said reaction mixture has the following molar composition:

| | |
|---|---|
| $H_2O/YO_2$ | 2 to 10; |
| Halide/$YO_2$ | 0.01 to 1; |
| R/$YO_2$ | 0.1 to 1; |
| $X_2O_3/YO_2$ | 0 to 0.1. |

46. A method of synthesizing a crystalline material comprising at least a CHA framework type molecular sieve and comprising $YO_2$, wherein Y is a tetravalent element, and optionally $X_2O_3$, wherein X is a trivalent element, the method comprising:
 (a) preparing a reaction mixture comprising a source of water, a source of the tetravalent element Y, optionally a source of the trivalent element X, and an organic directing agent (R) comprising at least one first organic directing agent for directing the formation of a CHA framework type material and at least one second organic directing agent for directing the formation of an AEI structure type material, said first and second directing agents being different and the first directing agent comprising a multi-cyclic amine or ammonium compound;
 (b) maintaining said reaction mixture under conditions sufficient to form crystals of said material; and
 (c) recovering said crystalline material from step (b).

47. The method of claim 46, wherein the crystalline material comprises a composition involving the molar relationship:

$$(n)X_2O_3:YO_2,$$

wherein n is from 0 to about 0.5.

48. A process for producing olefins comprising the step of contacting an organic oxygenate compound under oxygenate conversion conditions with a catalyst comprising a porous crystalline material substantially free of framework phosphorus and comprising a CHA framework type molecular sieve with stacking faults or at least one intergrown phase of a CHA framework type molecular sieve and an AEI framework type molecular sieve, wherein said material, in its calcined, anhydrous form, has a composition involving the molar relationship:

$$(n)X_2O_3:YO_2,$$

wherein X is a trivalent element; Y is a tetravalent element; and n is from 0 to about 0.5.

49. The process of claim 48, wherein n is from about 0.001 to about 0.1.

50. The process of claim 48, wherein wherein n is from about 0.0017 to about 0.02.

51. The process of claim 48, wherein said organic oxygenate compound comprises methanol, dimethyl ether or a mixture thereof.

* * * * *